US012574527B2

(12) United States Patent  
Yu et al.

(10) Patent No.: US 12,574,527 B2  
(45) Date of Patent: Mar. 10, 2026

(54) METHODS FOR ENCODING AND DECODING FEATURE DATA, AND DECODER

(71) Applicants: ZHEJIANG UNIVERSITY, Hangzhou (CN); GUANGDONG OPPO MOBILE TELECOMMUNICATIONS CORP., LTD., Dongguan (CN)

(72) Inventors: Lu Yu, Dongguan (CN); Yuchao Shao, Dongguan (CN); Yaqing Pan, Dongguan (CN); Hualong Yu, Dongguan (CN); Zhenyu Dai, Dongguan (CN)

(73) Assignees: ZHEJIANG UNIVERSITY, Hangzhou (CN); GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 210 days.

(21) Appl. No.: 18/458,937

(22) Filed: Aug. 30, 2023

(65) Prior Publication Data

US 2023/0412820 A1 Dec. 21, 2023

Related U.S. Application Data

(63) Continuation of application No. PCT/CN2021/078550, filed on Mar. 1, 2021.

(51) Int. Cl.  
$$
\begin{array}{ll}
\textit{H04N 19/172} & (2014.01) \\
\textit{G06V 10/44} & (2022.01) \\
\textit{G06V 10/82} & (2022.01)
\end{array}
$$

(52) U.S. Cl.  
CPC .......... _H04N 19/172_ (2014.11); _G06V 10/44_ (2022.01); _G06V 10/82_ (2022.01)

(58) Field of Classification Search  
CPC ......... G06V 10/82; G06V 10/44; H04N 19/00  
See application file for complete search history.

(56) References Cited

FOREIGN PATENT DOCUMENTS

| | | |
|---|---|---|
| CN | 109101948 | 12/2018 |
| CN | 109254946 | 1/2019 |

(Continued)

OTHER PUBLICATIONS

Chen et al., "Toward Intelligent Sensing: Intermediate Deep Feature Compression," IEEE Transactions on Image Processing, 2020, vol. 29.

(Continued)

_Primary Examiner_ — Kyle M Lotfi  
(74) _Attorney, Agent, or Firm_ — Hodgson Russ LLP

(57) ABSTRACT

Embodiments of the disclosure provide a method for encoding feature data, a method for decoding feature data, and a decoder. The method for encoding feature data includes the following. Feature data of multiple channels corresponding to a picture to-be-processed is obtained. Feature data of a reference channel in the feature data of the multiple channels is determined. Sorted feature data of the multiple channels is obtained by sorting, starting from the feature data of the reference channel, the feature data of the multiple channels in a descending order of similarity among the feature data of the multiple channels. The sorted feature data of the multiple channels is spliced to obtain a target feature frame sequence. The target feature frame sequence is encoded to generate a bitstream.

19 Claims, 14 Drawing Sheets

(56) References Cited

FOREIGN PATENT DOCUMENTS

| CN | 110494892 | 11/2019 |
| WO | 2018221863 | 12/2018 |
| WO | 2021011315 | 1/2021 |

OTHER PUBLICATIONS

Choi et al., "Deep Feature Compression for Collaborative Object Detection," 25th IEEE International Conference on Image Processing (ICIP), 2018.

Bai et al., "Toward Intelligent Visual Sensing and Low-cost Analysis: A Collaborative Computing Approach," IEEE Visual Communications and Image Processing (VCIP), 2019.

Chen et al., "Lossy Intermediate Deep Learning Feature Compression and Evaluation," Proceedings of the 27th ACM International Conference on Multimedia (MM '19), Oct. 2019.

Wang et al., "End-to-End Facial Deep Learning Feature Compression with Teacher-Student Enhancement," arxiv:2002.03627v1, Feb. 2020.

Wang et al., "Towards analysis-friendly face representation with scalable feature and texture compression," arXiv:2004.10043v1, Apr. 2020.

Eshratifar et al., "BottleNet: A deep learning architecture for intelligent mobile cloud computing services," arXiv:1902.01000v1, Feb. 2019.

Suzuki et al., "Deep Feature Compression With Spatio-Temporal Arranging for Collaborative Intelligence," IEEE International Conference on Image Processing (ICIP), 2020.

WIPO, International Search Report and Written Opinion for International Application No. PCT/CN2021/078550, Dec. 7, 2021.

Chen et al., "Data Representation in Hybrid Coding Framework for Feature Maps Compression," 2020 IEEE International Conference on Image Processing (ICIP), IEEE, Oct. 2020.

EPO, Extended European Search Report for EP Application No. 21928437.9, Dec. 16, 2024.

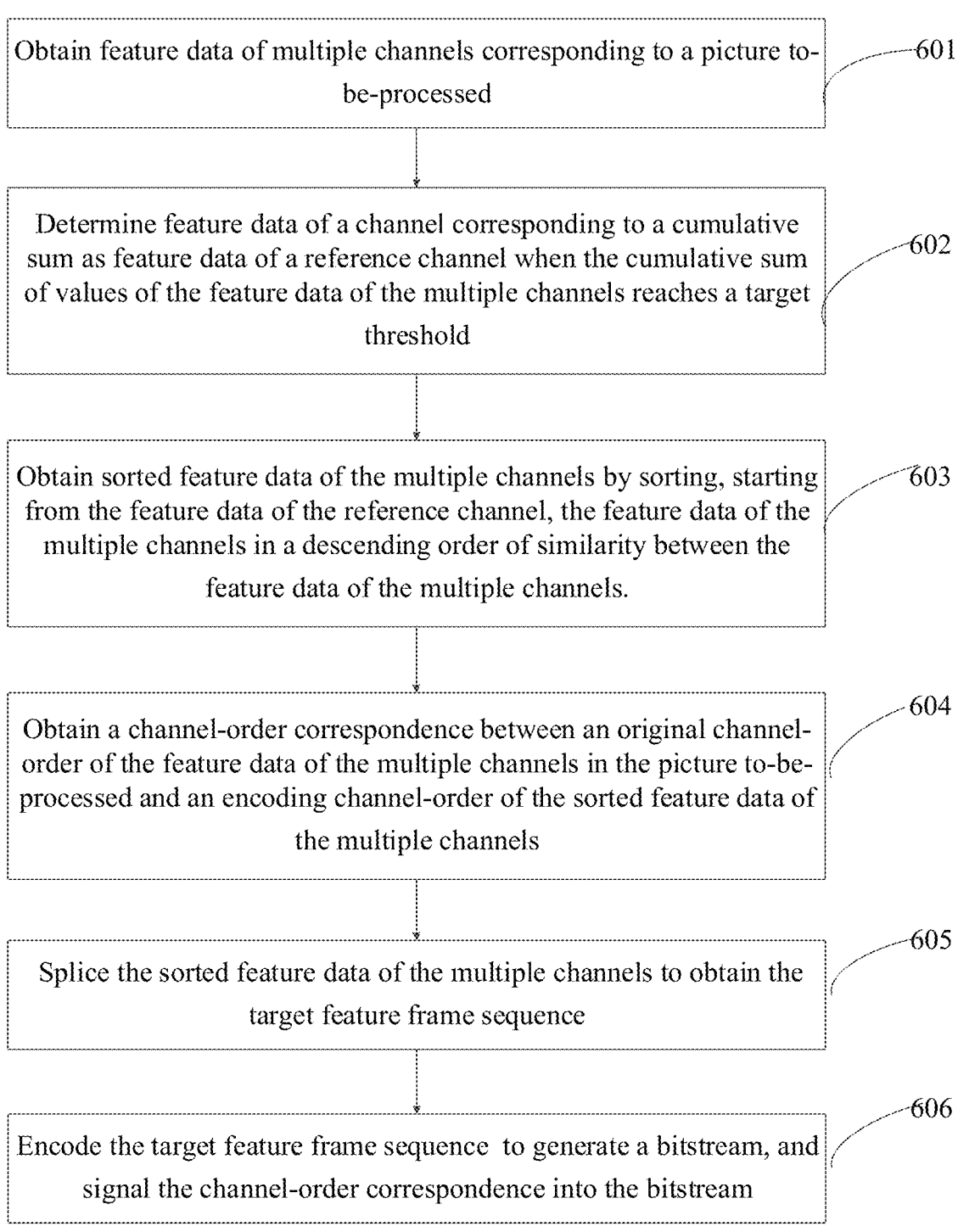

Obtain feature data of multiple channels corresponding to a picture to-be-processed     601

Determine feature data of a channel corresponding to a cumulative sum as feature data of a reference channel when the cumulative sum of values of the feature data of the multiple channels reaches a target threshold     602

Obtain sorted feature data of the multiple channels by sorting, starting from the feature data of the reference channel, the feature data of the multiple channels in a descending order of similarity between the feature data of the multiple channels.     603

Obtain a channel-order correspondence between an original channel-order of the feature data of the multiple channels in the picture to-be-processed and an encoding channel-order of the sorted feature data of the multiple channels     604

Splice the sorted feature data of the multiple channels to obtain the target feature frame sequence     605

Encode the target feature frame sequence to generate a bitstream, and signal the channel-order correspondence into the bitstream     606

FIG. 6

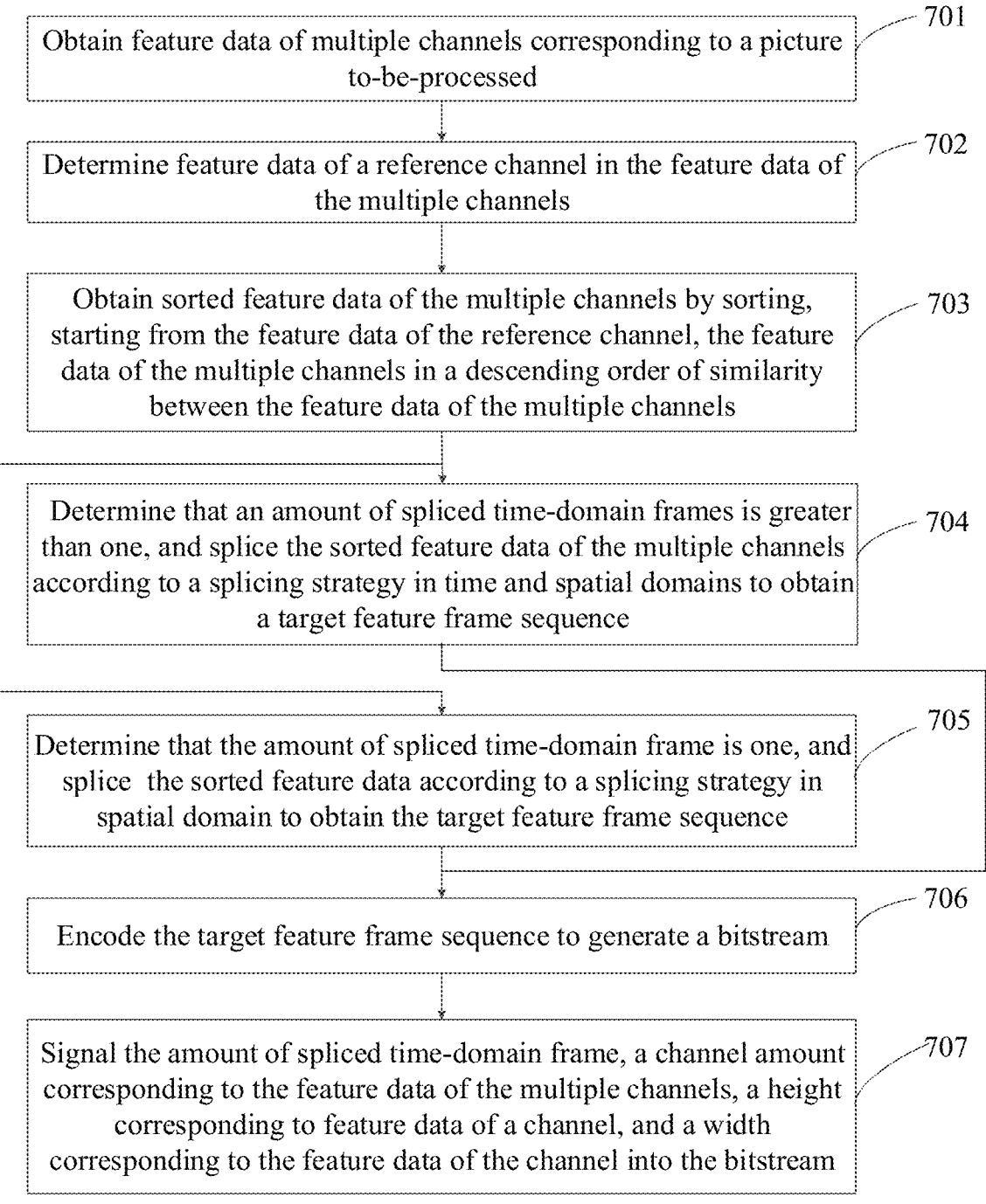

Obtain feature data of multiple channels corresponding to a picture to-be-processed ⎯ 701

Determine feature data of a reference channel in the feature data of the multiple channels ⎯ 702

Obtain sorted feature data of the multiple channels by sorting, starting from the feature data of the reference channel, the feature data of the multiple channels in a descending order of similarity between the feature data of the multiple channels ⎯ 703

Determine that an amount of spliced time-domain frames is greater than one, and splice the sorted feature data of the multiple channels according to a splicing strategy in time and spatial domains to obtain a target feature frame sequence ⎯ 704

Determine that the amount of spliced time-domain frame is one, and splice the sorted feature data according to a splicing strategy in spatial domain to obtain the target feature frame sequence ⎯ 705

Encode the target feature frame sequence to generate a bitstream ⎯ 706

Signal the amount of spliced time-domain frame, a channel amount corresponding to the feature data of the multiple channels, a height corresponding to feature data of a channel, and a width corresponding to the feature data of the channel into the bitstream ⎯ 707

FIG. 7

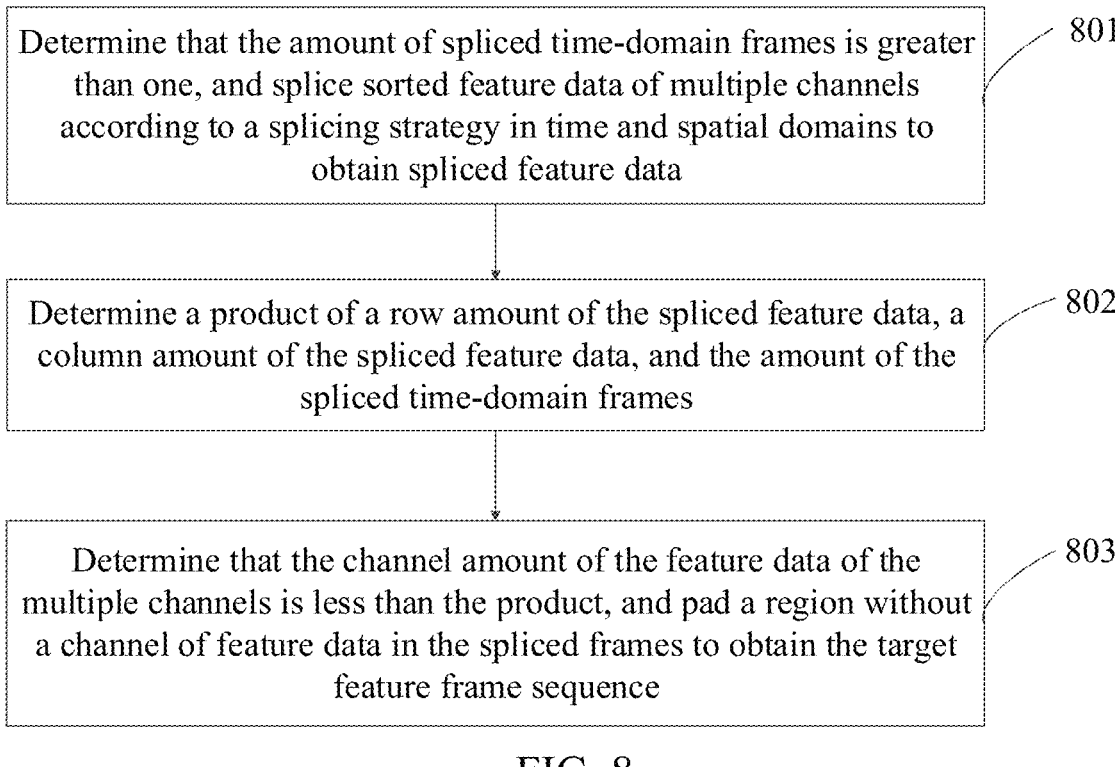

Determine that the amount of spliced time-domain frames is greater than one, and splice sorted feature data of multiple channels according to a splicing strategy in time and spatial domains to obtain spliced feature data — 801

Determine a product of a row amount of the spliced feature data, a column amount of the spliced feature data, and the amount of the spliced time-domain frames — 802

Determine that the channel amount of the feature data of the multiple channels is less than the product, and pad a region without a channel of feature data in the spliced frames to obtain the target feature frame sequence — 803

FIG. 8

Determine that the amount of spliced time-domain frames is greater than one, and according to a splicing strategy of first time domain and then spatial domain in time and spatial domains, in time domain, splice the sorted feature data at same positions in different frames according to a raster scan order — 901

In spatial domain, splice the sorted feature data is at adjacent positions according to the raster scan order, or splice the sorted feature data at adjacent positions according to a zigzag scan order — 902

FIG. 9

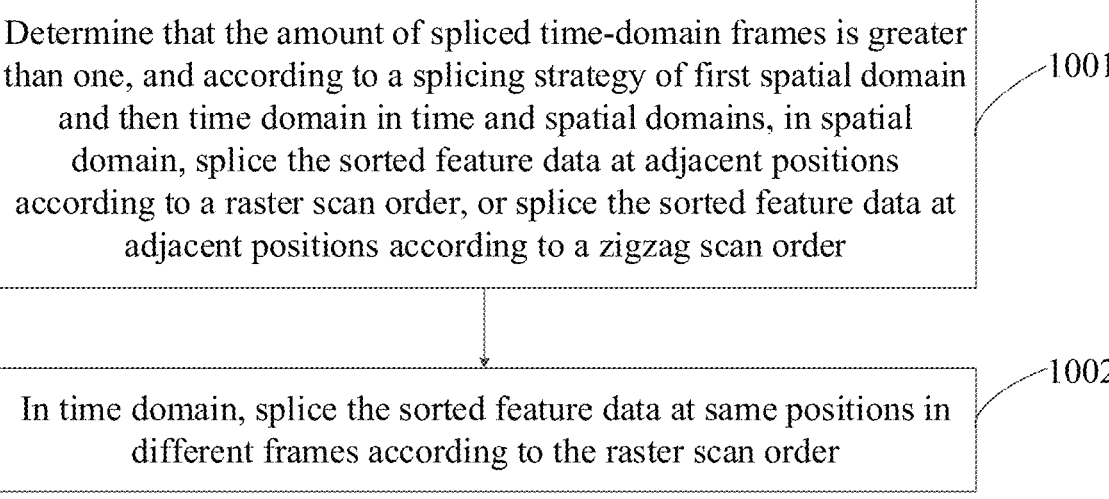

Determine that the amount of spliced time-domain frames is greater than one, and according to a splicing strategy of first spatial domain and then time domain in time and spatial domains, in spatial domain, splice the sorted feature data at adjacent positions according to a raster scan order, or splice the sorted feature data at adjacent positions according to a zigzag scan order ⟋1001

In time domain, splice the sorted feature data at same positions in different frames according to the raster scan order ⟋1002

FIG. 10

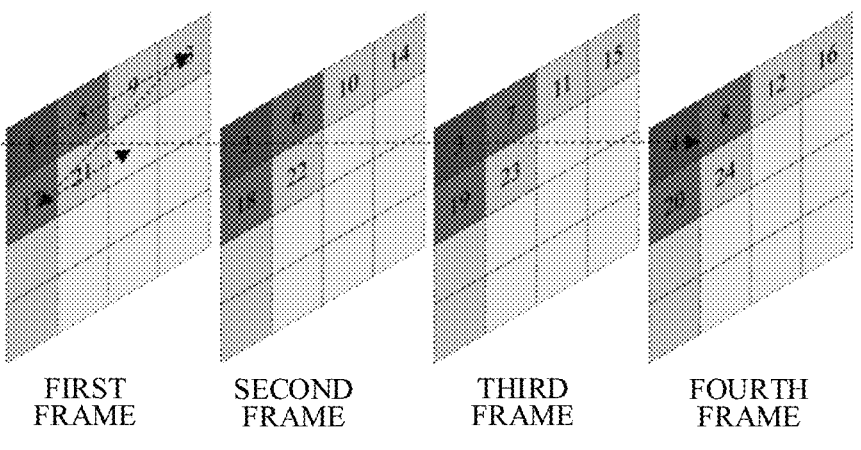

FIRST          SECOND          THIRD          FOURTH
FRAME          FRAME           FRAME          FRAME

FIG. 11

FIRST
FRAME

SECOND
FRAME

THIRD
FRAME

FOURTH
FRAME

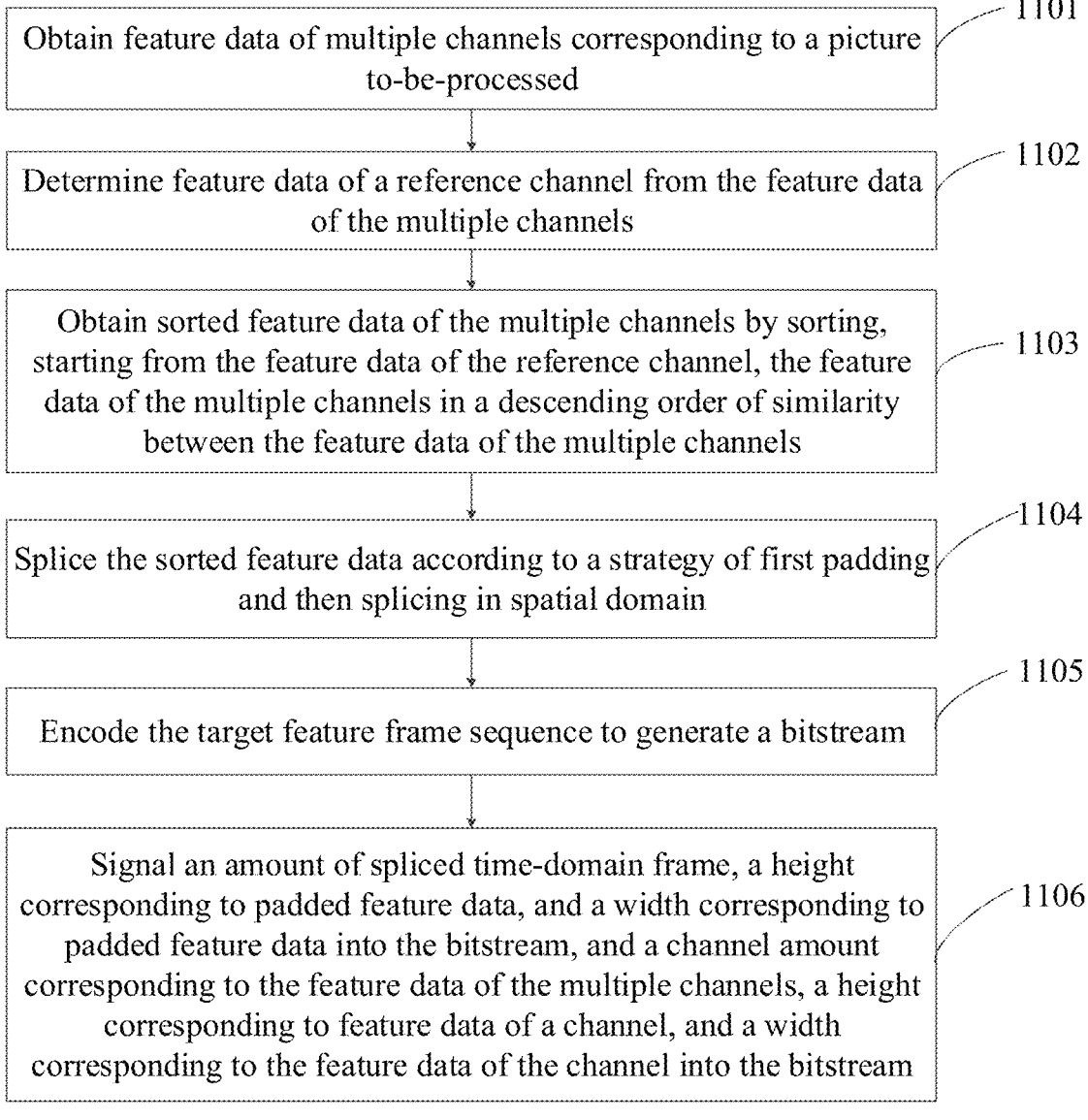

Obtain feature data of multiple channels corresponding to a picture
to-be-processed          1101

Determine feature data of a reference channel from the feature data
of the multiple channels          1102

Obtain sorted feature data of the multiple channels by sorting,
starting from the feature data of the reference channel, the feature
data of the multiple channels in a descending order of similarity
between the feature data of the multiple channels          1103

Splice the sorted feature data according to a strategy of first padding
and then splicing in spatial domain          1104

Encode the target feature frame sequence to generate a bitstream          1105

Signal an amount of spliced time-domain frame, a height
corresponding to padded feature data, and a width corresponding to
padded feature data into the bitstream, and a channel amount
corresponding to the feature data of the multiple channels, a height
corresponding to feature data of a channel, and a width
corresponding to the feature data of the channel into the bitstream          1106

FIG. 13

Parse a bitstream to obtain reconstructed feature frame sequence ⌐1201

Sort inversely the reconstructed feature frame sequence to obtain reconstructed feature data of multiple channels ⌐1202

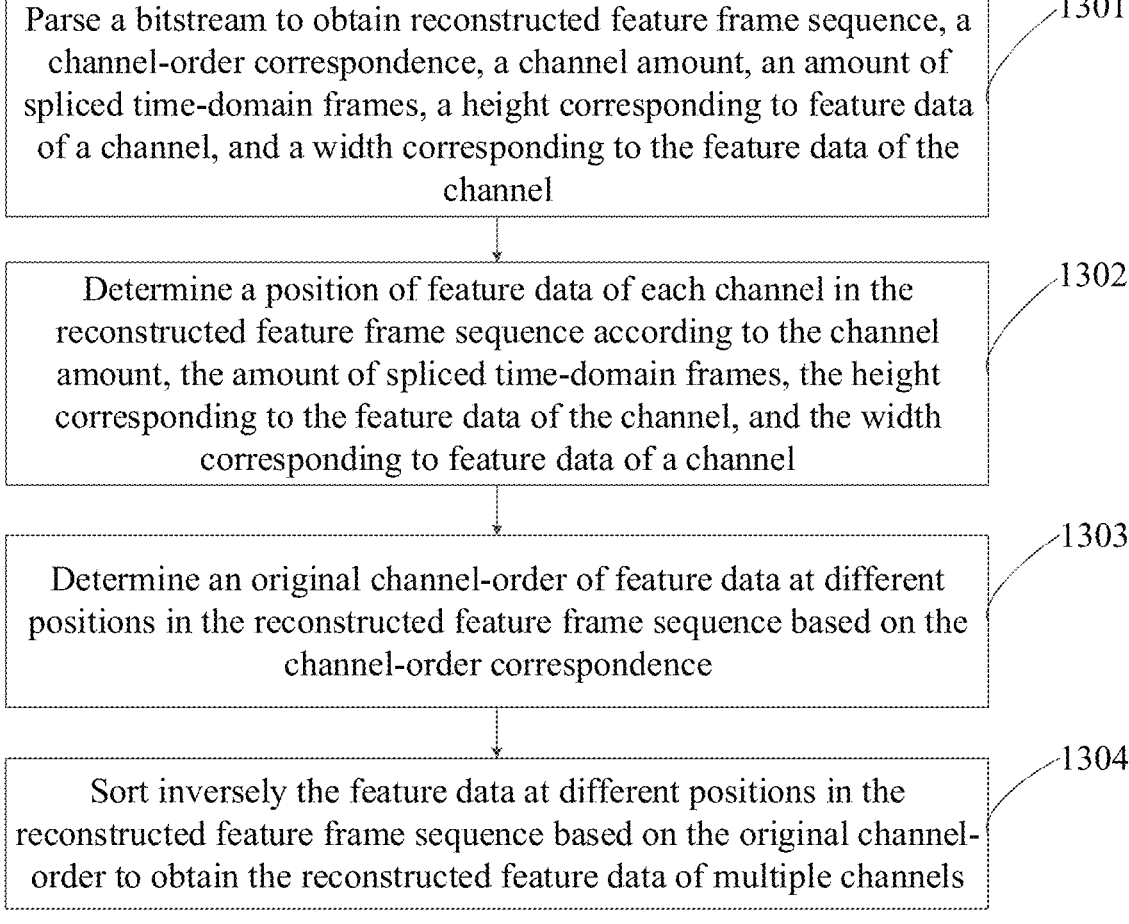

Parse a bitstream to obtain reconstructed feature frame sequence, a channel-order correspondence, a channel amount, an amount of spliced time-domain frames, a height corresponding to feature data of a channel, and a width corresponding to the feature data of the channel    1301

Determine a position of feature data of each channel in the reconstructed feature frame sequence according to the channel amount, the amount of spliced time-domain frames, the height corresponding to the feature data of the channel, and the width corresponding to feature data of a channel    1302

Determine an original channel-order of feature data at different positions in the reconstructed feature frame sequence based on the channel-order correspondence    1303

Sort inversely the feature data at different positions in the reconstructed feature frame sequence based on the original channel-order to obtain the reconstructed feature data of multiple channels    1304

FIG. 16

Parse a bitstream to obtain a reconstructed feature frame sequence, a channel-order correspondence, a channel amount, the amount of spliced time-domain frames, a height corresponding to padded feature data, a width corresponding to the padded feature data, a height corresponding to feature data of a channel, and a width corresponding to feature data of a channel    1401

Determine the position of feature data of each channel in the reconstructed feature frame sequence according to the channel amount, the amount of spliced time-domain frames, the height corresponding to the padded feature data, the width corresponding to the padded feature data, the height corresponding to the feature data of the channel, and the width corresponding to the feature data of the channel    1402

Determine an original channel-order of feature data at different positions in the reconstructed feature frame sequence based on the channel-order correspondence    1403

Sort inversely the feature data at different positions in the reconstructed feature frame sequence based on the original channel-order to obtain the reconstructed feature data of multiple channels    1404

FIG. 17

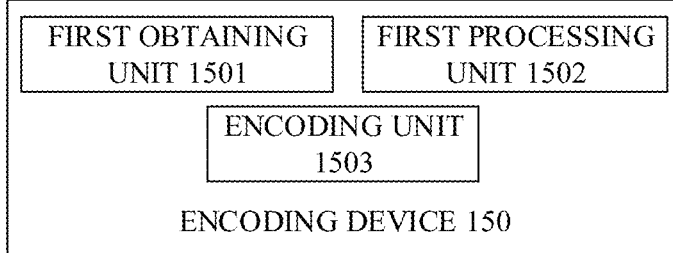

FIRST OBTAINING UNIT 1501    FIRST PROCESSING UNIT 1502

ENCODING UNIT 1503

ENCODING DEVICE 150

FIG. 18

METHODS FOR ENCODING AND DECODING FEATURE DATA, AND DECODER

CROSS-REFERENCE TO RELATED APPLICATION(S)

This application is a continuation of International Application No. PCT/CN2021/078550, filed Mar. 1, 2021, the entire disclosure of which is incorporated herein by reference.

TECHNICAL FIELD

Embodiments of the disclosure relate to a coding technology in the communication field, and in particular, to a method for encoding feature data, a method for decoding feature data, and a decoder.

BACKGROUND

At present, in a process of traditional video coding, a feature map coding process includes three main modules: pre-quantization/pre-dequantization, repack/de-repack, and traditional video encoding/decoding. Data of pre-quantized and repacked feature map array is sent to a traditional video encoder for compression and encoding in the form of luminance-chrominance (YUV) video data, and a bitstream generated by the traditional video encoder is included in a data bitstream of feature maps. Repack/de-repack has several modes, which are superposition of feature maps in a specified order, tiling of feature maps in a default order or in a specified order.

However, in the superposition mode, only a single list is applied to describe the order of feature channels, and there is no guidance and design for reference relationship among the feature channels in video encoding and decoding device, which makes the encoding efficiency of the feature channels after superposition not high. In the tiling mode, multi-channel feature data are tiled in a picture according to the order described in the single list, and the multi-channel data are closely adjacent to one another, which leads to data of multiple channels being partitioned into a same coding unit by a block partition operation when encoding the tiled picture using an existing method for processing feature data. Because of discontinuity among different channel data, a correlation among data of different channels in the same coding unit is weak, such that efficiency of the existing method for processing feature data cannot be effectively exerted.

Therefore, there is at least a problem of low coding efficiency when coding based on the feature data in related art.

SUMMARY

In a first aspect, embodiments of the disclosure provide a method for encoding feature data. The method includes the following. Feature data of multiple channels corresponding to a picture to-be-processed is obtained. Feature data of a reference channel in the feature data of the multiple channels is determined. Sorted feature data of the multiple channels is obtained by sorting, starting from the feature data of the reference channel, the feature data of the multiple channels in a descending order of similarity among the feature data of the multiple channels. The sorted feature data of the multiple channels is spliced to obtain a target feature frame sequence. The target feature frame sequence is encoded to generate a bitstream.

In a second aspect, embodiments of the disclosure further provide a method for decoding feature data. The method includes the following. A bitstream is parsed to obtain reconstructed feature frame sequence. The reconstructed feature frame sequence is sorted inversely to obtain reconstructed feature data of multiple channels.

In a third aspect, embodiments of the disclosure provide a decoder. The decoder includes a second memory and a second processor. The second memory is configured to store a computer program capable of running on the second processor. The second processor is configured to perform the decoding method as described in the second aspect when running the computer program.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

FIG. 6 is a second schematic flowchart of an exemplary method for encoding feature data provided in embodiments of the disclosure.

FIG. 7 is a third schematic flowchart of an exemplary method for encoding feature data provided in embodiments of the disclosure.

FIG. 8 is a fourth schematic flowchart of an exemplary method for encoding feature data provided in embodiments of the disclosure.

FIG. 9 is a fifth schematic flowchart of an exemplary method for encoding feature data provided in embodiments of the disclosure.

FIG. 10 is a sixth schematic flowchart of an exemplary method for encoding feature data provided in embodiments of the disclosure.

FIG. 11 is a schematic diagram illustrating raster-scan splicing provided in embodiments of the disclosure.

FIG. 13 is a seventh schematic flowchart of an exemplary method for encoding feature data provided in embodiments of the disclosure.

FIG. 16 is a second schematic flowchart of an exemplary method for decoding feature data provided in embodiments of the disclosure.

FIG. 17 is a third schematic flowchart of an exemplary method for decoding feature data provided in embodiments of the disclosure.

FIG. 18 is a schematic structural diagram of an encoder provided in embodiments of the disclosure.

DETAILED DESCRIPTION

In order to make the purpose, technical solutions and advantages of embodiments of the disclosure clearer, the specific technical solutions of the disclosure will be described in further detail below in conjunction with the accompanying drawings in embodiments of the disclosure. The following embodiments are used to illustrate the disclosure but are not intended to limit the scope of the disclosure.

Unless otherwise defined, all technical and scientific terms used herein have the same meanings as those commonly understood by those skilled in the art of the disclosure. Terms used herein are for the purpose of describing embodiments of the disclosure only and are not intended to limit the disclosure.

In the following description, reference is made to "some embodiments" which describe a subset of all possible embodiments, but it is understood that "some embodiments" may be the same subset or different subsets of all possible embodiments and may be combined with each other without conflict.

It should be pointed that the term "first/second/third" in embodiments of the disclosure is only used to distinguish similar objects, and does not represent a particular ordering of objects, and it is understood that the "first/second/third" may be interchanged in a particular order or sequence where permitted, so that embodiments of the disclosure described herein can be implemented in an order other than that illustrated or described herein.

Prior to further detailed description of embodiments of the disclosure, the terms and terminology referred to in embodiments of the disclosure will be described, and the terms and terminology are applicable to the following interpretation.

1) Three-dimensional (3D) feature data tensor includes a channel amount (C), a height (H), and a width (W).

2) Feature data is the output data at the intermediate layer of neural networks.

In the application scene for intelligent analysis, videos and pictures are not only presented to users for high-quality viewing, but also used to analyze and understand the semantic information therein. In order to meet the unique demand of video and picture coding for an intelligent analysis task, at present, the traditional compression encoding which is performed directly on the picture is changed to compression encoding which is performed on feature data output at an intermediate layer in an intelligent analysis task network.

Figure 1:
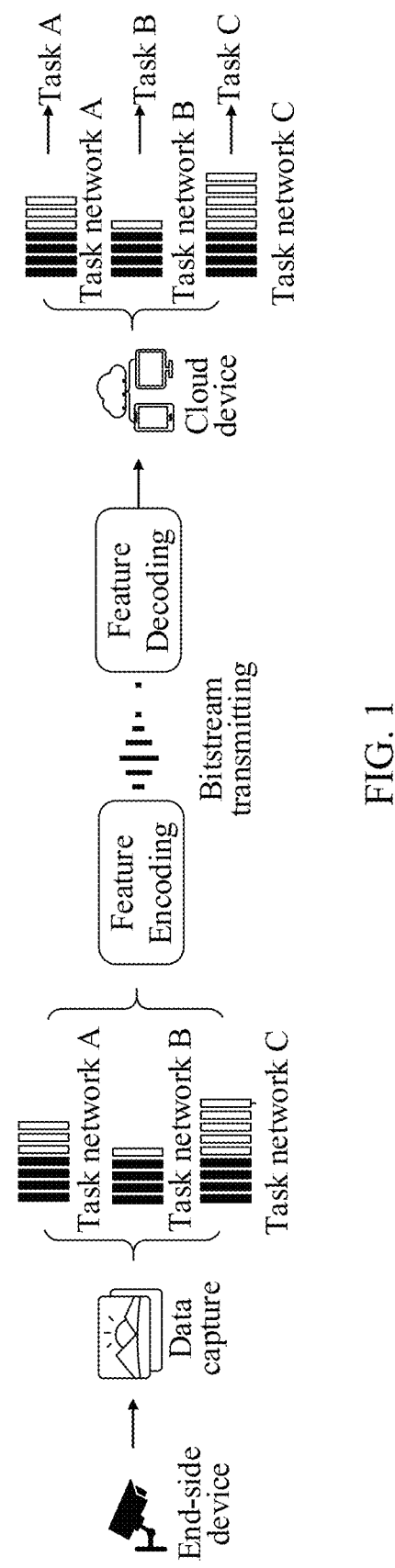
FIG. 1 is a schematic diagram of a "pre-analysis and then compression" framework provided in embodiments of the disclosure.

An end-side device, such as camera, firstly pre-analyzes the captured or input original video and picture data by using a task network, extracts feature data sufficient for cloud analysis, and compresses, encodes, and transmits the feature data. After receiving the corresponding bitstream, a cloud device reconstructs corresponding feature data according to the syntax information of the bitstream, and inputs the feature data into a specific task network to continue analysis. This "pre-analysis and then compression" framework is as illustrated in FIG. 1. In this framework, there is a large amount of feature data transmitted between the end-side device and the cloud device. The purpose of feature data compression is to compress and encode feature data extracted from the existing task network in a recoverable manner for further intelligent analysis and processing by the cloud.

As illustrated in FIG. 1, in an application scene, for example, a face recognition scene, an end-side device, such as a picture capture device, captures a portrait and inputs the portrait into a neural network for face recognition. Here, the neural network includes at least one neural network. For example, the neural network includes task network A, task network B, and task network C. These neural networks may be the same or different. Taking a 10-layer neural network as an example, because the local computing power of the picture capture device is insufficient, only 5 layers can be executed. After original feature data is output from an intermediate layer of the neural network, the picture capture device processes the original feature data to obtain the feature data meeting a data input condition of a feature encoding device. Further, the picture capture device sends the feature data meeting the input condition to an encoding device. The encoding device encodes the feature data meeting the input condition, and signals the feature data meeting the input condition into the bitstream. Then the encoding device sends the bitstream to a feature decoding device, where the feature decoding device may be disposed in a cloud device such as a cloud server. That is, after obtaining the bitstream, the end-side device sends the bitstream to the cloud server for processing. The cloud server decodes and reconstructs the bitstream through the feature decoding device to obtain reconstructed feature data. Finally, the cloud server inputs the reconstructed feature data corresponding to each channel into the sixth layer of the neural network, and continuously executes the sixth layer to the tenth layer to obtain a recognition result.

For such a video and picture high-efficiency encoding problem oriented to an intelligent analysis task scene, the moving picture experts group (MPEG) has established a video coding for machines (VCM) standard working group at the 127th meeting in July, 2019 to study the technology in this field. The purpose is to define a bitstream for compressed video or feature information extracted from video, such that the same bitstream can be used to execute multiple intelligent analysis tasks without significantly reducing the analysis performance of intelligent tasks. Meanwhile, the decompressed information is more friendly to the intelligent analysis task, and the performance loss of the intelligent analysis task is less at the same bitrate. At the same time, the multimedia sub-committee standard working conference established by the national information technology standardization technology committee convened a first working group conference in the Hangzhou city of Zhejiang Province in January, 2020. Correspondingly, a data compression for machines (DCM) standard working group is established to study technical applications of this field. The purpose is to support involved machine intelligence applications or hybrid human-machine applications through efficient data expression and compression.

Figure 2:
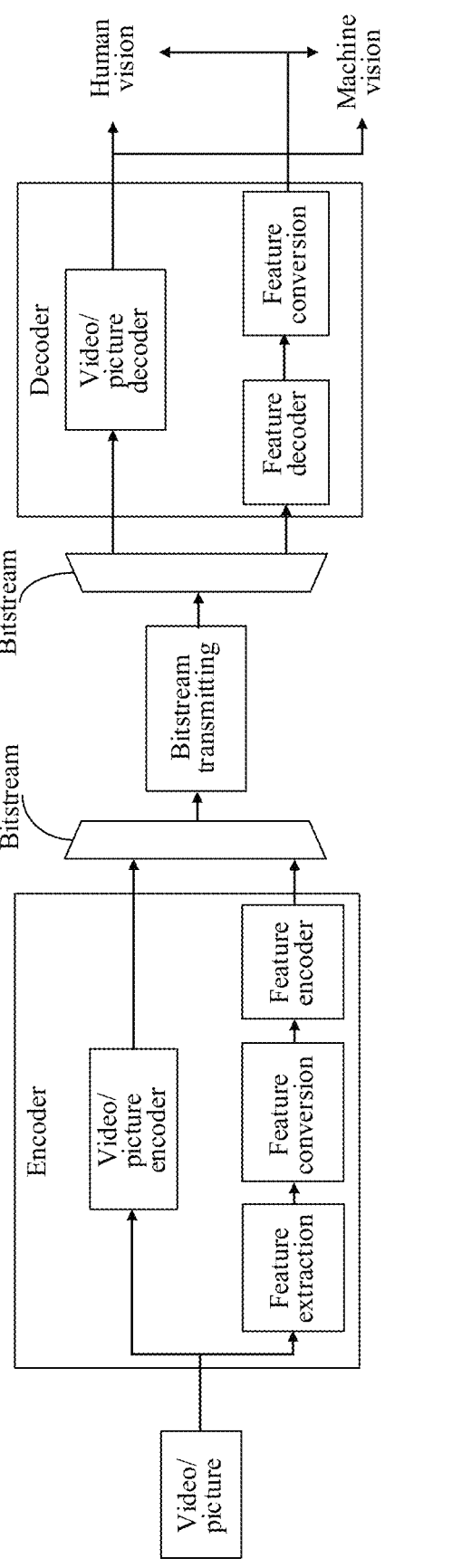
FIG. 2 is a schematic encoding flowchart in the related art provided in embodiments of the disclosure.

At present, a corresponding potential encoding flowchart is designed by the VCM standard working group, as illustrated in FIG. 2, so as to improve the encoding efficiency of a video and a picture for the intelligent analysis task. The video and the picture may directly pass through a video and picture encoder optimized for the task. Optionally, the feature data may be extracted and encoded using network pre-analysis, and then the decoded feature data may be input into the subsequent network for further analysis. If the existing video and image coding standards need to be reused to compress the extracted feature data, the feature data represented in the floating-point type needs to be processed to the fixed-point type, and converted into an input suitable for the existing coding standards. For example, feature data of multiple channels is spliced into a feature frame sequence in a single-frame or multi-frame YUV format and then input into a video encoder for compression and encoding.

The compression technology for feature data output from the intermediate layer of the task network may be further studied for the coding process. For example, the encoding efficiency of the feature data output at different layers of some commonly-used task networks in lossless compression and lossy compression may be studied. By using the reference software of video coding standard H.265/HEVC to compress and encode the feature data, it is considered that there is little difference in the signal fidelity of the feature data within a large bitrate interval. However, when the bitrate is below a certain threshold, the signal fidelity of the feature data decreases sharply. For another example, it is studied to use the existing video coding standard to perform lossy compression on the feature data and introduce lossy compression into network training, thereby proposing a strategy to improve task accuracy during lossy compression.

Reuse of the traditional video coding standard requires converting feature data into a feature frame sequence in a YUV format. In a research on a conversion manner of feature data, multi-channel feature data output from a task network is spliced according to a channel order into a single-frame and multi-frame feature frame sequence in spatial domain, and is compressed and encoded. An experimental result shows that for feature data output from a superficial layer of a network, for the manner of splicing into a single-frame feature frame sequence and the manner of splicing into a multi-frame feature frame sequence, encoding efficiency of two manners are relatively close, and for feature data output from a deep layer of the network, encoding efficiency of splicing into a single-frame feature frame sequence is obviously higher than splicing into a multi-frame feature frame sequence. In the research on an evaluation index of feature data encoding efficiency, it is found that in some cases, using task accuracy as an evaluation index, compressed feature data may obtain higher performance than target data. Therefore, corresponding evaluation indexes are established respectively for three tasks of image classification, image search, and image recognition. Since over-fitting or under-fitting may be occurred for a task network after training, the task performance for feature data may be higher than the target performance when the bitrate is high. Moreover, the method of establishing a set of evaluation indexes for each task has poor universality. Therefore, an appropriate bitrate interval may be selected, that is, the coding efficiency of the feature data is measured without considering situations of high bitrate and low task performance.

In addition, a neural network may be utilized to reduce dimensions of the feature data to achieve the goal of compressing the data volume.

In conclusion, there are three major problems in the research of feature data compression technology at present. Firstly, the feature data compression technology in the research is only oriented to special application scenes and a few task networks with the amount of intermediate layer data less than a target input, and performance is poor for feature data output by most other task networks. Secondly, the method in the research only considers the amount of compressed feature data, while the quality of a task is not considered. For example, using a neural network to reduce dimensions of the feature data is difficult to achieve a high-precision task requirement. In addition, since the task quality after the compression is not considered, appropriate guidance and evaluation of the compression of the feature data cannot be performed. Thirdly, feature data is compressed in combination with traditional video and picture coding technology, but the difference between the feature data and the traditional video and picture is not considered, so that the existing video and picture coding technology is not utilized efficiently to achieve high coding efficiency.

Further, coding processes in related art are explained.

Figure 3:
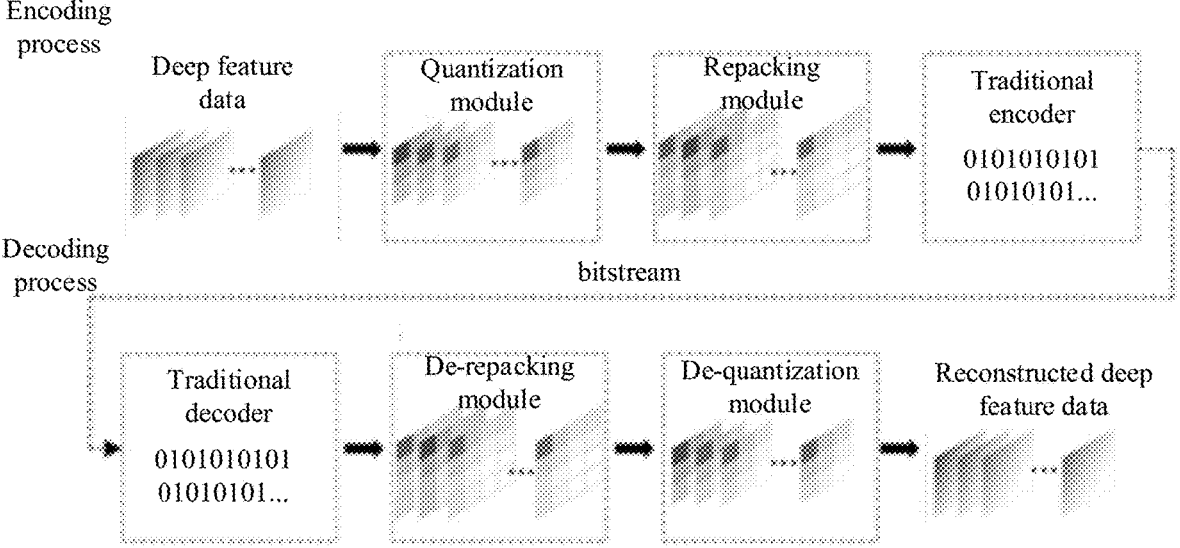
FIG. 3 is a schematic encoding flowchart in the related art provided in embodiments of the disclosure.

First related art: the process of coding feature data is illustrated in FIG. 3, which includes three main modules: pre-quantization/pre-dequantization, repack/de-repack, and traditional video encoding/decoding. The specific content of the modules are as follows.

Pre-quantization/pre-dequantization: when the target input feature map is floating-point type, the feature map needs to be pre-quantized to convert into integer data meeting the input requirements of a traditional video encoder.

Repack/de-repack: the repack module converts the target feature map from a three-dimensional array into information in the YUV format meeting the input requirements of the traditional video encoder. In addition, by changing the combination manner of feature maps, the coding efficiency of the traditional video encoder for feature map data is improved. Repack/de-repack has several optional modes, which are superposition of feature maps in a specified order, tiling of feature maps in a default order or in a specified order.

Superposition of feature maps in a specified order: In this mode, each channel of the feature map corresponds to one frame in the input data of the traditional video encoder. The height and width of the feature map are extended to the height and width that meet the input requirements of the traditional video encoder. The channel order of the feature maps is stored in the repack_order_list of the feature map, where the contents of the repack_order_list may default to an array with default order (for example, [0,1,2,3 . . . ]).

In the superposition mode, only a single list is applied to describe the order of the feature channels, and there is no guidance and design for reference relationship among the feature channels in video encoding and decoding device, which makes the encoding efficiency among the feature channels after superposition not high.

Tiling of feature maps in a default order or in a specified order: in this mode, multiple channels of feature map are tiled and spliced into a two-dimensional array as a frame in the input data of the traditional video encoder. The height and width corresponding to the spliced array are extended to the height and width meeting the input requirements of the traditional video encoder. The splicing order is the channel order of the target feature maps. The feature maps are arranged first in the wide direction of the array and then in the high direction of the array. After the current frame is fully tiled, the next frame is created and continued to be tiled until all the channels of the feature maps are tiled. The channel order is recorded in repack_order_list, the contents of the list may default to an array with default order (for example, [0,1,2,3 . . . ]).

In the tiling mode, multi-channel data of feature are tiled in a picture according to an order described in a single list, and the multi-channel data are closely adjacent, which leads to data of multiple channels being partitioned into a same coding unit by a block partition operation when encoding a tiled picture using an existing method for encoding and decoding. Because of discontinuity among different channel data, a correlation of the different channel data in the same coding unit is weak, such that efficiency of the existing method for encoding and decoding cannot be effectively exerted, and the compression effect of the feature data is not good enough.

Traditional video encoding/decoding: the pre-quantized and repacked feature map array is sent to the traditional video encoder for compression and encoding in the form of YUV video data, and the bitstream generated by the traditional video encoder is included in the feature map data bitstream. For HEVC video encoder, the feature map array is input in YUV4:0:0 format. For AVS3 video encoder, the feature map array is input in YUV4:2:0 format.

Second related art: in MPEG immersive video, there is a technology to re-express and rearrange the contents of pictures captured by various cameras at the same time, so as to express and encode visual information efficiently. Specifically, in MPEG immersive video, multiple cameras will be placed according to a certain position relationship in the scene to be shot, and these cameras are also called reference viewpoints. There is some visual redundancy among the contents shot by each of the reference viewpoints. Therefore, it is necessary to re-express and reorganize the pictures captured by all reference viewpoints at the encoding end to remove the visual redundancy among the viewpoints, and to parse and restore the re-expressed and reorganized information at the decoding end.

At the encoding end, the picture captured by the reference viewpoint is re-expressed by cropping patches of different sizes in a rectangular shape out of the picture captured by the reference viewpoint. After all necessary patches are cropped, these patches are sorted from largest to smallest. According to the above order, the patches are arranged one by one on a picture to-be-padded having a higher resolution, and the picture to-be-padded is called an atlas. When arranging the patches, the pixel at the upper-left of each patch must fall on the pixel at the upper-left of a partitioned 8*8 picture block in the picture to-be-padded. Every time a patch is arranged, the arrangement serial number, the coordinates of the pixel at the upper-left, and the resolution of the patch currently arranged will be recorded and stored in the repack order list about patches in order. When all the patches are arranged, the atlas and the patch information list will be sent to the traditional video codec for encoding.

At the decoding end, after obtaining the reconstructed atlas and the patch information list, pixels in the patches arranged in the atlas are rendered one by one in the order of arranging the patches recorded in the patch information list, so as to synthesize a picture at the viewpoint of a viewer.

In the solution of re-expressing and rearranging visual information in the MPEG immersive video, the arrangement is performed only according to the strategy of sorting areas of patches from largest to smallest. The texture similarity and spatial position similarity among the patches are not considered for the arrangement, which will lead to the efficiency of the existing method for encoding and decoding cannot be fully exerted when the reorganized atlas picture is sent into the traditional video encoder and decoder.

Figure 4:
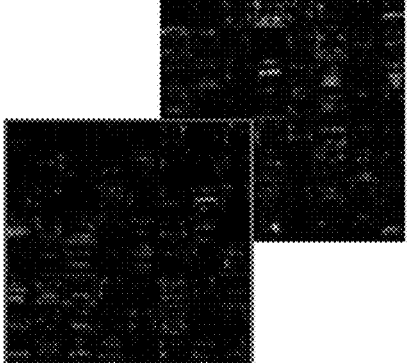
FIG. 4 is a schematic diagram illustrating time-spatial splicing in the related art provided in embodiments of the disclosure.

Third related art: a method for splicing feature data in time-spatial domains based on similarity measurement is illustrated in FIG. 4. Experiments are established based on the feature data of the multiple channels output from the visual geometry group (VGG) under the picture recognition task and the intermediate layer of residual network (ResNet). The feature data is compressed and encoded by reusing the existing video coding standard H.265/HEVC. The encoding efficiency can be improved by 2.27% on average compared with the simple spatial arrangement method.

At the encoding end, the feature data output from a specific layer is spliced into two frames according to the channel order. The similarity between the two frames is measured by mean square error (MSE). By iteratively exchanging the channels of feature data of the two frames and calculating the similarity between the two frames, an arrangement with the greatest similarity between the two frames is finally obtained. A list corresponding to the target channel-order and the new channel-arrangement-order is transmitted to the decoding end.

After the decoding end obtains the corresponding feature data by reconstruction, the target feature data arrangement is recovered and obtained according to the list corresponding to the target channel order and the new channel-arrangement-order. Then the target feature data arrangement is input into a subsequent task network for further inference analysis.

On the premise that the feature data is divided into two frames according to the channel order, the similarity is maximized by exchanging the channels of the feature data between the two frames. In this case, the correlation among the channels of the feature data in the same frame is not considered. In addition, the arrangement manner for multiple frames is not considered. Therefore, the correlation among different channels is not fully utilized in the encoding of the feature data to achieve the best encoding efficiency.

In order to solve the problems existing in related art, and fully mine and utilize the similarity among channels of feature data, the disclosure provides a technology of time-spatial domain sorting, splicing, encoding, and decoding. The basic idea of this technology is as follows. In the pre-processing stage, the feature data of the multiple channels output by the intermediate layer of the neural network is sorted, and according to the sorting order, the feature data of channels is spliced into a multi-frame feature sequence in the time and spatial domains in a specific manner. In the encoding stage, the feature frame sequence is encoded with the optimized inter reference structure, and the pre-processing key information is encoded to obtain the final bitstream. In the decoding stage, the reconstructed feature frame sequence and the reconstructed pre-processing key information are parsed from the received bitstream. In the post-processing stage, according to the reconstructed pre-processing key information, the reconstructed feature frame sequence is post-processed to obtain the reconstructed feature data, and the reconstructed feature data is used in the subsequent network for further task inference analysis.

Figure 5:
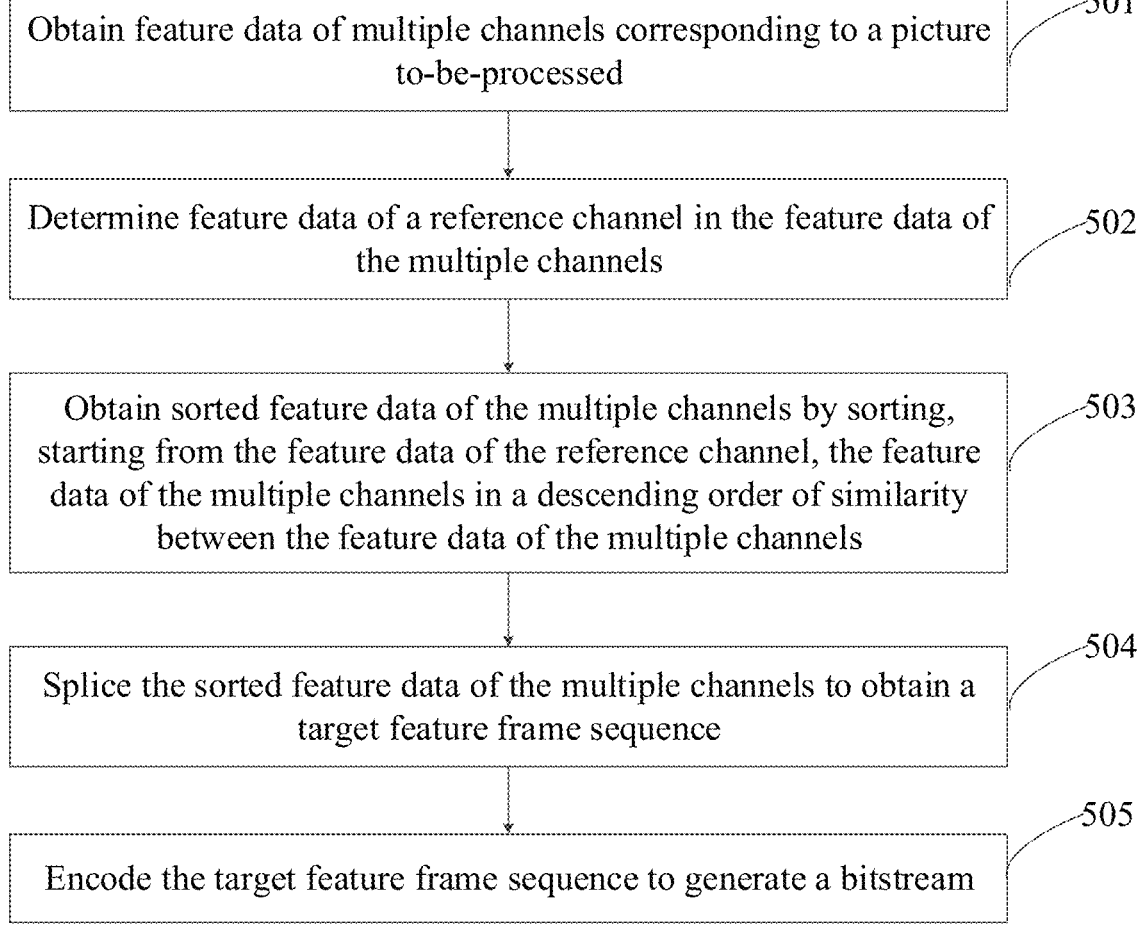
FIG. 5 is a first schematic flowchart of an exemplary method for encoding feature data provided in embodiments of the disclosure.

Embodiments of the disclosure provide a method for encoding feature data, which is applied to an encoder. As illustrated in FIG. 5, the method includes the following operations.

At block 501, feature data of multiple channels corresponding to a picture to-be-processed is obtained.

In embodiments of the disclosure, the feature data of the multiple channels corresponding to the picture to-be-processed may be obtained at block 501 as follows. The picture to-be-processed is obtained. Feature extraction is performed on the picture to-be-processed using a neural network model to obtain the feature data of the multiple channels.

In some embodiments, after the encoder obtains the picture to-be-processed, the picture to-be-processed is input into the neural network model. Then the feature data of each channel output by the intermediate layer of the neural network model is obtained. Here, a channel of the picture is a feature map of the picture. A channel is the detection of a certain feature. The strength of a value in the channel reflects the strength of the current feature.

At block 502, feature data of a reference channel in the feature data of the multiple channels is determined.

In embodiments of the disclosure, the feature data of the reference channel may be feature data of any channel in the feature data of the multiple channels.

The feature data of the reference channel is determined in order to determine a sorting starting object when sorting the feature data of the multiple channels subsequently.

At block 503, sorted feature data of the multiple channels is obtained by sorting, starting from the feature data of the reference channel, the feature data of the multiple channels in a descending order of similarity among the feature data of the multiple channels.

In embodiments of the disclosure, after the feature data of the reference channel is determined, with feature data of the reference channel is used as the sorting starting object, and the feature data of the multiple channels are sorted in a descending order of similarity among the feature data of the multiple channels, so as to obtain the sorted feature data. That is, the feature data of all channels are sorted according to the similarity from largest to smallest between feature data of each channel and the feature data of the reference channel. It should be noted that the correlation of feature data among adjacent channels in time and spatial domains is large after sorting.

At block 504, the sorted feature data of the multiple channels is spliced to obtain a target feature frame sequence.

In embodiments of the disclosure, the feature data of the multiple channels are sorted according to the similarity based on the information redundancy among the feature data of the multiple channels output from the intermediate layer of the neural network. Then according to the sorting order, the feature data of the multiple channels are arranged into the target feature frame sequence in the time domain and spatial domain, or in the spatial domain. As such, the feature data with high similarity in adjacent regions can be used as reference for subsequent encoding, thus improving the encoding efficiency of the feature data.

At block 505, the target feature frame sequence is encoded to generate a bitstream.

In embodiments of the disclosure, in the process of splicing the sorted feature data of the multiple channels to obtain the target feature frame sequence, if splicing is performed first in time domain and then in spatial domain, the feature data can be better encoded using the inter coding technology. If splicing is performed first in spatial domain and then in time domain, the feature data can be better encoded using the intra coding technology. In this way, the technologies in the existing video coding standard can be reused to encode the feature data efficiently.

The embodiments of the disclosure provide a method for encoding feature data. In the method for encoding feature data, feature data of multiple channels corresponding to a picture to-be-processed is obtained. Feature data of a reference channel in the feature data of the multiple channels is determined. Sorted feature data of the multiple channels is obtained by sorting, starting from the feature data of the reference channel, the feature data of the multiple channels in a descending order of similarity among the feature data of the multiple channels. The sorted feature data of the multiple channels is spliced to obtain a target feature frame sequence. The target feature frame sequence is encoded to generate a bitstream. That is, in the disclosure, after the feature data of the multiple channels are obtained, feature data of one channel is used as a reference, i.e., the feature data of the reference channel is obtained. The feature data of all channels is sorted according to the descending order of similarity between the feature data of each channel and the feature data of the reference channel. As such, the correlation among adjacent channels in time and spatial domains is large after sorting, so that feature data of the channel in an adjacent region with high similarity can be used as reference for subsequent coding, thereby improving the coding efficiency of feature data.

Embodiments of the disclosure provide a method for encoding feature data, which is applied to an encoder. As illustrated in FIG. 6, the method includes the following operations.

At block 601, feature data of multiple channels corresponding to a picture to-be-processed is obtained.

At block 602, when a cumulative sum of values of the feature data of the multiple channels reaches a target threshold, feature data of a channel corresponding to the cumulative sum is determined as feature data of a reference channel.

The cumulative sum of values of the feature data reaches the target threshold refers to that the cumulative sum of values of the feature data is the greatest, or the cumulative sum of values of the feature data is the smallest. In this case, the feature data of the channel corresponding to a maximum or minimum cumulative sum of the values of feature data is selected as the feature data of the reference channel, which can improve the encoding efficiency.

At block 603, sorted feature data of the multiple channels is obtained by sorting, starting from the feature data of the reference channel, the feature data of the multiple channels in a descending order of similarity among the feature data of the multiple channels.

In embodiments of the disclosure, after the sorting starting object is determined, the similarity between feature data of each of remaining channels and feature data of a current channel may be determined based on an iterative algorithm. In this case, the similarity may be measured by sum of absolute difference (SAD) and/or mean squared error (MSE). Therefore, feature data of a channel with the greatest similarity is selected as sorted feature data of a next channel.

As an example, the SAD is calculated as follows.

$$SAD = \sum_{x=1}^{H}\sum_{y=1}^{W}|c_1(x, y) - c_2(x, y)|$$

As an example, the MSE is calculated as follows.

$$MSE = \frac{1}{H*W}\sum_{x=1}^{H}\sum_{y=1}^{W}(c_1(x, y) - c_2(x, y))^2$$

At block 604, a channel-order correspondence between an original channel-order of the feature data of the multiple channels in the picture to-be-processed and an encoding channel-order of the sorted feature data of the multiple channels is obtained.

Here, the encoding channel-order refers to the channel order of the sorted feature data of each channel. In the subsequent encoding process, the encoding is performed with reference to the above channel-order after the sorting, so the channel-order after the sorting is called encoding channel-order.

In embodiments of the disclosure, after the feature data of all channels are sorted according to similarity, a channel-order correspondence between the order before the sorting and the order after the sorting is stored. In an implementable scene, the channel-order correspondence between the orders before and after the sorting may be stored in the sorting list channel_idx.

The sorting list may be in many forms, including but not limited to one-dimensional list, two-dimensional list, and three-dimensional list.

In some embodiments of the disclosure, when the amount of spliced time-domain frame is one, the original channel-order is an X-th channel, and the encoding channel-order corresponding to the original channel-order is an I-th channel.

In this case, the sorting list is the one-dimensional list channel_idx[I]=X. For the one-dimensional list channel_idx [N][I]=X, X may be the original channel-order (the order before sorting) corresponding to the feature data of the I-th channel after sorting.

In other embodiments of the disclosure, the correspondence between the original channel-order and the encoding channel-order includes: when the amount of spliced time-domain frame is at least two, the original channel-order is the X-th channel, and the encoding channel-order corresponding to the original channel-order is the I-th channel in the N-th frame.

In this case, the sorting list is the two-dimensional list channel_idx[n][I]=X. For the two-dimensional list channel_idx [N][I]=X, X may be the original channel-order (the order before sorting) corresponding to the feature data of the I-th channel in the N-th frame after sorting.

In other embodiments of the disclosure, the correspondence between the original channel-order and the encoding channel-order includes: when the amount of spliced time-domain frame is at least two, the original channel-order is the X-th channel, and the encoding channel-order corresponding to the original channel-order is the I-th channel in the M-th region in the N-th frame.

In this case, the sorting list is the three-dimensional list channel_idx[N][M][I]=X. For the three-dimensional list channel_idx[N][M][I]=X, X may be the original channel-order (the order before sorting) corresponding to the feature data of the I-th channel in the M-th region in the N-th frame after sorting.

At block 605, the sorted feature data of the multiple channels is spliced to obtain the target feature frame sequence.

In embodiments of the disclosure, the sorted feature data is spliced in the time and spatial domains according to a specific splicing manner. In the time domain, the sorted feature data is spliced into a target feature frame sequence in which the amount of spliced time-domain frames is frame_count. The amount of spliced time-domain frames is the amount of frames obtained after splicing the sorted feature data of the multiple channels in the time domain, and is set at the encoding end.

In some embodiments of the disclosure, if the spliced time-domain frame frame_count is 1, the feature data is spliced only in spatial domain after sorting. The encoding end can flexibly set the amount of spliced time-domain frames according to the actual demand.

In some embodiments of the disclosure, assuming that the spliced feature data is the feature data of row rows and col columns of channels, and a channel amount of the feature data is C, if:

$$C < row * col * frame\_count,$$

then in this case, the empty channel of feature data in the last frame may be padded to fill the last frame for encoding.

At block 606, the target feature frame sequence is encoded to generate a bitstream, and the channel-order correspondence is signalled into the bitstream.

It should be noted that in the embodiment of disclosure, reference for the same operations and content as that in other embodiments can be made to the description in other embodiments and will not be repeated here.

Embodiments of the disclosure provide a method for encoding feature data, which is applied to an encoder. As illustrated in FIG. 7, the method includes the following operations.

At block 701, feature data of multiple channels corresponding to a picture to-be-processed is obtained.

At block 702, feature data of a reference channel in the feature data of the multiple channels is determined.

At block 703, sorted feature data of the multiple channels is obtained by sorting, starting from the feature data of the reference channel, the feature data of the multiple channels in a descending order of similarity among the feature data of the multiple channels.

At block 704, when determining that an amount of spliced time-domain frames is greater than one, the sorted feature data of the multiple channels is spliced according to a splicing strategy in time and spatial domains to obtain a target feature frame sequence.

In embodiments of the disclosure, as illustrated in FIG. 8, when determining that the amount of spliced time-domain frames is greater than one, the sorted feature data of the multiple channels may be spliced according to the splicing strategy in time and spatial domains to obtain the target feature frame sequence at block 704 as follows.

At block 801, when determining that the amount of spliced time-domain frames is greater than one, the sorted feature data of the multiple channels is spliced according to a splicing strategy in time and spatial domains to obtain spliced feature data.

At block 802, a product of a row amount of the spliced feature data, a column amount of the spliced feature data, and the amount of the spliced time-domain frames are determined.

At block 803, when determining that the channel amount of the feature data of the multiple channels is less than the product, a region without a channel of feature data in the spliced frames is padded to obtain the target feature frame sequence.

In this case, the region without a channel of feature data in the spliced frames is padded, that is, the region without a channel of feature data in the spliced feature frame sequence is padded, so as to improve encoding efficiency. The region without a channel of feature data may be a region in the last frame of the spliced feature frame sequence. The region without a channel of feature data may also be a region in at least one frame other than the last frame of the spliced feature frame sequence.

In embodiments of the disclosure, as illustrated in FIG. 9, when determining that the amount of spliced time-domain frame is greater than one is determined, the sorted feature data of the multiple channels may be spliced according to the splicing strategy in time and spatial domains to obtain the target feature frame sequence at block 704 as follows.

At block 901, when determining that the amount of spliced time-domain frames is greater than one, according to a splicing strategy of first time domain and then spatial domain in time and spatial domains, in time domain, the sorted feature data is spliced at same positions in different frames according to a raster scan order.

At block 902, in spatial domain, the sorted feature data is spliced at adjacent positions according to the raster scan order, or the sorted feature data is spliced at adjacent positions according to a zigzag scan order.

In this case, by splicing first in time domain and then in spatial domain, the feature data can be better encoded using the inter coding technology, so that the technology in the existing video coding standard can be reused to encode the feature data efficiently.

In embodiments of the disclosure, as illustrated in FIG. 10, when determining that the amount of spliced time-domain frame is greater than one, the sorted feature data of the multiple channels may be spliced according to the splicing strategy in time and spatial domains to obtain the target feature frame sequence at block 704 as follows.

At block 1001, when determining that the amount of spliced time-domain frames is greater than one, according to a splicing strategy of first spatial domain and then time domain in time and spatial domains, in spatial domain, the sorted feature data is spliced at adjacent positions according to a raster scan order, or the sorted feature data is spliced at adjacent positions according to a zigzag scan order.

At block 1002, in time domain, the sorted feature data is spliced at same positions in different frames according to the raster scan order.

In this case, by splicing first in spatial domain and then in time domain, the feature data can be better encoded using the intra coding technology, so that the technology in the existing video coding standard can be reused to encode the feature data efficiently.

At block 705, when determining that the amount of spliced time-domain frame is one, the sorted feature data is spliced according to a splicing strategy in spatial domain to obtain the target feature frame sequence.

At block 706, the target feature frame sequence is encoded to generate a bitstream.

At block 707, the amount of spliced time-domain frame, a channel amount corresponding to the feature data of the multiple channels, a height corresponding to feature data of a channel, and a width corresponding to the feature data of the channel are signalled into the bitstream.

In an implementable scene, raster-scan splicing is further explained. Taking a spliced video sequence with a total number of 4 frames as an example, FIG. 11 is a schematic diagram illustrating the raster-scan splicing. The sorted feature data may be spliced in, but not limited to, the following manners.

First in time domain, splicing is performed at same positions in different frames according to a raster scan order, and then in spatial domain, splicing is performed at adjacent positions according to the raster scan order.

Alternatively, first in spatial domain, splicing is performed at adjacent positions according to the raster scan order, and then in time domain, splicing is performed at same positions in different frames according to the raster scan order.

Figure 12:
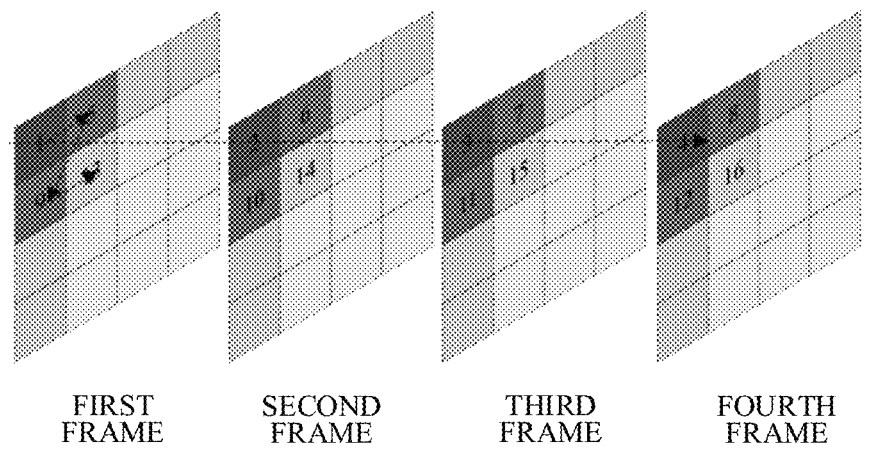
FIG. 12 is a schematic diagram illustrating zigzag-scan splicing provided in embodiments of the disclosure.

In an implementable scene, zigzag-scan splicing is further explained. Taking a spliced video sequence with a total number of 4 frames as an example, FIG. 12 is a schematic diagram illustrating zigzag-scan splicing. The sorted feature data may be spliced in, but not limited to, the following manners.

First in time domain, splicing is performed at same positions in different frames according to the raster scan order, and then in spatial domain, splicing is performed at an adjacent position according to a zigzag scan order.

Alternatively, first in spatial domain, splicing is performed at adjacent positions according to the zigzag scan order, and then in time domain, splicing is performed at same positions in different frames according to the raster scan order.

In embodiments of the disclosure, in addition to the bitstream information generated from traditional video encoding, the following additional information is transmitted, which is also called time-spatial arrangement information of feature data. The additional information includes a channel amount C of the feature data, a height h corresponding to feature data of a channel, and a width w corresponding to the feature data of the channel, the sorting list channel_idx, an amount of spliced time-domain frames frame_count.

It should be noted that in the embodiment of disclosure, reference for the same operations and content as that in other embodiments can be made to the description in other embodiments and will not be repeated here.

Embodiments of the disclosure provide a method for encoding feature data, which is applied to an encoder. As illustrated in FIG. 13, the method includes the following operations. At block 1101, feature data of multiple channels corresponding to a picture to-be-processed is obtained.

At block 1102, feature data of a reference channel is determined from the feature data of the multiple channels.

At block 1103, sorted feature data of the multiple channels is obtained by sorting, starting from the feature data of the reference channel, the feature data of the multiple channels in a descending order of similarity among the feature data of the multiple channels.

At block 1104, the sorted feature data is spliced according to a strategy of first padding and then splicing in spatial domain.

In embodiments of the disclosure, the sorted feature data may be spliced according to the strategy of first padding and then splicing in spatial domain at block 1104 as follows. Each of the sorted feature data is padded in spatial domain. Padded feature data is spliced in spatial domain, where there is a gap between feature data of adjacent channels after padding.

Figures 14, 15:
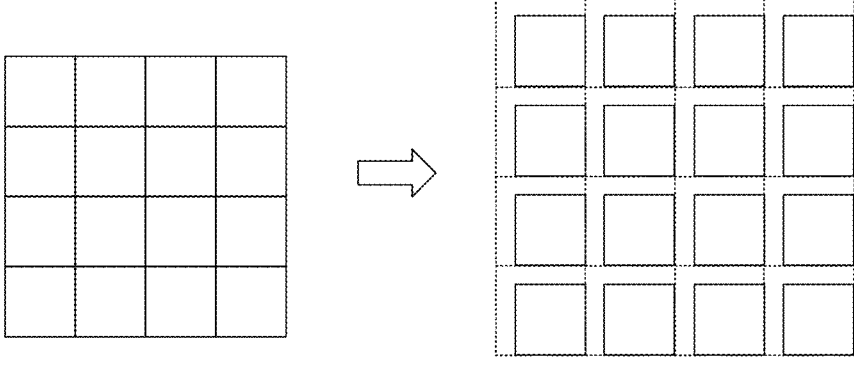
FIG. 14 is a schematic diagram illustrating padding between feature data of adjacent channels in a spatial domain provided in embodiments of the disclosure.
FIG. 15 is a first schematic flowchart of an exemplary method for decoding feature data provided in embodiments of the disclosure.

As illustrated in FIG. 14, each of the sorted feature data may be padded in spatial domain as follows. Padded is performed between feature data of adjacent channels to ensure that there is a gap between the feature data of adjacent channels after the padding. Further, the gap size between the feature data of adjacent channels may be the same. For example, the distances between each small box and each dotted box in the up, down, left, right directions are the same. In embodiments of the disclosure, padding between the feature data of adjacent channels can reduce the mutual influence of values between different channels, and thus improve the signal fidelity of channel boundaries.

At block 1105, the target feature frame sequence is encoded to generate a bitstream.

At block 1106, an amount of spliced time-domain frame, a height corresponding to padded feature data, and a width corresponding to padded feature data are signalled into the bitstream, and a channel amount corresponding to the feature data of the multiple channels, a height corresponding to feature data of a channel, and a width corresponding to the feature data of the channel are signalled into the bitstream.

In this case, the time-spatial arrangement information of the feature data further includes the height corresponding to the padded feature data and the width corresponding to the padded feature data.

In other embodiments of the disclosure, the solution of splicing the sorted feature data in spatial domain according to the strategy of first padding and then splicing at block 1104 is also applicable to block 901, block 1001, and block 705. For example, in the process of executing block 901, when determining that the amount of spliced time-domain frames is greater than one, according to the splicing strategy of first time domain and then spatial domain in time and spatial domains: in time domain, the sorted feature data is spliced at same positions in different frames according to a raster scan order. Then based on the strategy of first padding and then splicing in spatial domain, each of the sorted feature data is padded in spatial domain. The padded feature data is spliced at adjacent positions according to the raster scan order in spatial domain, or is spliced at adjacent positions according to the zigzag scan order in spatial domain.

For example, in the process of executing block 1001, when determining that the amount of spliced time-domain frames is greater than one, based on the strategy of first padding and then splicing in spatial domain, each of the sorted feature data is padded in spatial domain, the padded feature data is spliced at adjacent positions according to the raster scan order in spatial domain, or is spliced at adjacent positions according to the zigzag scan order in spatial domain. Then the padded feature data is spliced at same positions in different frames according to the raster scan order in time domain.

For example, in the process of executing block 705, when determining that the amount of spliced time-domain frame is one, based on the strategy of padding and then splicing in spatial domain, each of the sorted feature data is padded in spatial domain, the padded feature data is spliced according to the splicing strategy to obtain the target feature frame sequence.

In an embodiment, the time-space arrangement information of feature data may be recorded in supplemental enhancement information (for example, supplemental enhancement information (SEI) of the existing video coding standard H.265/HEVC or H.266/VVC, or extension data of the AVS standard). For example, a new SEI class, which is feature data quantization SEI message, is added in sei_pay-lod( ) of sei_message( ) of sei_rbsp( ) in the existing video coding standard AVC/HEVC/VVC/EVC. payloadType may be defined as any number not used by other SEI, such as 183. In this case, the syntax structure is illustrated in Table 1.

TABLE 1

| syntax structure of sei_payload ( ) |
| --- |
| sei_payload( payloadType, payloadSize ) { |
| if( nal_unit_type == PREFIX_SEI_NUT ) { |
| if( payloadType == 0 ) |

TABLE 1-continued

| syntax structure of sei_payload ( ) |
| --- |
| buffering_period( payloadSize ) |
| . . . |
| if( payloadType == 183 ) |
| feature_time_space_arrange ( payloadSize ) |
| } |
| } |

If the sorting list is a one-dimensional sorting list, the syntax structure is:

| feature_time_space_arrange ( payloadSize ) { |
| --- |
| feature_channel_count |
| feature_frame_count |
| feature_single_channel_height |
| feature_single_channel_width |
| for(I= 0; I <= feature_channel_count; I++ ) { |
| channel_idx[I] |
| } |
| } |

Syntax elements may be encoded in different efficient entropy encoding modes, where syntax elements are:

feature_channel_count: used to describe that the channel amount of the feature data is feature_channel_count;

feature_frame_count: used to describe that the amount of frames spliced from the feature data is feature_frame_count;

feature_single_channel_height: used to describe that the height corresponding to feature data of a channel is feature_single_channel_height;

feature_single_channel_width: used to describe that the width corresponding to feature data of a channel is feature_single_channel_width; and channel_idx[I]: used to describe that the original channel-order corresponding to the feature data of the I-th channel after sorting is channel_idx[I].

It should be noted that in the embodiment of disclosure, reference for the same operations and content as that in other embodiments can be made to the description in other embodiments and will not be repeated here.

Embodiments of the disclosure provide a method for decoding feature data, which is applied to a decoder. As illustrated in FIG. 15, the method includes the following operations.

At block 1201, a bitstream is parsed to obtain reconstructed feature frame sequence.

At block 1202, the reconstructed feature frame sequence is inversely sorted to obtain reconstructed feature data of multiple channels.

In the method for decoding feature data provided in embodiments of the disclosure, the bitstream is parsed to obtain the reconstructed feature frame sequence, and the reconstructed feature frame sequence is inversely sorted to obtain the reconstructed feature data of multiple channels. In this way, the feature data of the multiple channels before sorting in time and spatial domains can be accurately recovered and used in the subsequent network for further task inference analysis.

Embodiments of the disclosure provide a method for decoding feature data, which is applied to a decoder. As illustrated in FIG. 16, the method includes the following operations.

At block 1301, a bitstream is parsed to obtain reconstructed feature frame sequence, a channel-order correspondence, a channel amount, an amount of spliced time-domain frames, a height corresponding to feature data of a channel, and a width corresponding to the feature data of the channel.

At block 1302, a position of feature data of each channel in the reconstructed feature frame sequence is determined according to the channel amount, the amount of spliced time-domain frames, the height corresponding to feature data of a channel, and the width corresponding to the feature data of the channel.

At block 1303, an original channel-order of feature data at different positions in the reconstructed feature frame sequence is determined based on the channel-order correspondence.

At block 1304, the feature data at different positions in the reconstructed feature frame sequence is inversely sorted based on the original channel-order to obtain the reconstructed feature data of multiple channels.

For example, after obtaining the reconstructed feature frame sequence and reconstructed time-space arrangement information of feature data, the decoding end sorts inversely the reconstructed feature frame sequence in time and spatial domains to obtain the reconstructed feature data as follows.

The position of the feature data of each channel in the feature frame sequence is determined based on a channel amount C of the feature data in the reconstructed time-space arrangement information of feature data, the amount of spliced time-domain frames frame_count, and a height h corresponding to feature data of a channel, and a width w corresponding to the feature data of the channel.

The original channel-order of the feature data of each channel before sorting is determined, taking the one-dimensional sorting list channel_idx[I]=X as an example, based on the sorting list channel_idx in the reconstructed time-space arrangement information of feature data. After the original channel-order of the feature data of all channels has been determined, the feature data at different positions in the reconstructed feature frame sequence is inversely sorted based on the original channel-order to obtain the reconstructed feature data of multiple channels.

It should be noted that in the embodiment of disclosure, reference for the same operations and content as that in other embodiments can be made to the description in other embodiments and will not be repeated here.

Embodiments of the disclosure provide a method for decoding feature data, which is applied to a decoder. As illustrated in FIG. 17, the method includes the following operations.

At block 1401, a bitstream is parsed to obtain a reconstructed feature frame sequence, a channel-order correspondence, a channel amount, the amount of spliced time-domain frames, a height corresponding to padded feature data, a width corresponding to the padded feature data, a height corresponding to feature data of a channel, and a width corresponding to the feature data of the channel.

At block 1402, the position of feature data of each channel in the reconstructed feature frame sequence is determined according to the channel amount, the amount of spliced time-domain frames, the height corresponding to the padded feature data, the width corresponding to the padded feature data, the height corresponding to the feature data of the channel, and the width corresponding to the feature data of the channel.

At block 1403, an original channel-order of feature data at different positions in the reconstructed feature frame sequence is determined based on the channel-order correspondence.

At block 1404, the feature data at different positions in the reconstructed feature frame sequence is inversely sorted based on the original channel-order to obtain the reconstructed feature data of multiple channels.

It should be noted that in the embodiment of disclosure, reference for the same operations and content as that in other embodiments can be made to the description in other embodiments and will not be repeated here.

The disclosure has at least the following beneficial effects. Based on the information redundancy among different channels of multi-channel feature data output from the intermediate layer of the neural network, all channels of multi-channel feature data are sorted according to the similarity. Then all channels of multi-channel feature data are arranged into feature frame sequence in time and spatial domains according to the sorting order. So that the channel of feature data with high similarity at adjacent regions can be used as a reference for encoding, which can improve the encoding efficiency of feature data. If splicing is performed first in time domain and then in spatial domain, the feature data can be better encoded using the inter coding technology. If splicing is performed first in spatial domain and then in time domain, the feature data can be better encoded using the intra coding technology. In this way, the technologies in the existing video coding standard can be reused to encode the feature data efficiently.

In other words, in the disclosure, in order to efficiently reuse the technology in the existing video coding standard to encode multi-channel feature output from the intermediate layer of the neural network, all channels of the feature data are sorted according to the similarity, and are arranged into a feature frame sequence in time and spatial domains. Because of the large correlation between adjacent channels in time domain and spatial domain after the sorting, the disclosure can make better use of existing intra prediction and inter prediction. The coding efficiency of feature data is further improved. In order to recover the feature data of the multiple channels before time-spatial arrangement after decoding, the time-spatial arrangement information of the feature data needs to be recorded in the bitstream.

FIG. 18 is a schematic structural diagram of an encoding device provided in embodiments of the disclosure. As illustrated in FIG. 18, the encoding device 150 includes a first obtaining unit 1501, a first processing unit 1502, and an encoding unit 1503.

The first obtaining unit 1501 is configured to obtain feature data of multiple channels corresponding to a picture to-be-processed.

The first processing unit 1502 is configured to determine feature data of a reference channel in the feature data of the multiple channels.

The first processing unit 1502 is further configured to obtain sorted feature data of the multiple channels by sorting, starting from the feature data of the reference channel, the feature data of the multiple channels in a descending order of similarity among the feature data of the multiple channels.

The first processing unit 1502 is further configured to splice the sorted feature data of the multiple channels to obtain a target feature frame sequence.

The encoding unit 1503 is configured to encode the target feature frame sequence to generate a bitstream.

In other embodiments of the disclosure, the first processing unit 1502 is further configured to determine, when a cumulative sum of values of the feature data of the multiple channels reaches a target threshold, feature data of a channel corresponding to the cumulative sum as feature data of a reference channel.

In other embodiments of the disclosure, the cumulative sum of values of the feature data reaches the target threshold refers to that the cumulative sum of values of the feature data is the greatest, or the cumulative sum of values of the feature data is the smallest.

In other embodiments of the disclosure, the first obtaining unit 1501 is further configured to obtain a channel-order correspondence between an original channel-order of the feature data of the multiple channels in the picture to-be-processed and an encoding channel-order of the sorted feature data of the multiple channels.

The encoding unit 1503 is further configured to signal a channel-order correspondence into the bitstream.

In other embodiments of the disclosure, the channel-order correspondence includes that:

when an amount of spliced time-domain frame is one, the original channel-order is an X-th channel, and the encoding channel-order corresponding to the original channel-order is an I-th channel; and when the amount of spliced time-domain frames is at least two, the original channel-order is the X-th channel, and the corresponding encoding channel-order is the I-th channel in the N-th frame.

In other embodiments of the disclosure, the first processing unit 1502 is further configured to when determining that the amount of spliced time-domain frames is greater than one, splice the sorted feature data of the multiple channels according to a splicing strategy in time and spatial domains to obtain a target feature frame sequence.

In other embodiments of the disclosure, the first processing unit 1502 is further configured to when determining that an amount of spliced time-domain frames is greater than one, splice the sorted feature data of the multiple channels according to a splicing strategy in time and spatial domains to obtain spliced feature data;

determine a product of a row amount of the spliced feature data, a column amount of the spliced feature data, and the amount of the spliced time-domain frames; and when determining that a channel amount of the feature data of the multiple channels is less than the product, pad a region without a channel of feature data in the spliced frames to obtain the target feature frame sequence.

In other embodiments of the disclosure, the first processing unit 1502 is further configured to when determining that the amount of spliced time-domain frames is greater than one, according to the splicing strategy of first time domain and then spatial domain in time and spatial domains, in time domain, splice at same positions in different frames according to a raster scan order; and in spatial domain, splice at adjacent positions according to the raster scan order, or splice at adjacent positions according to a zigzag scan order.

In other embodiments of the disclosure, the first processing unit 1502 is further configured to when determining that the amount of spliced time-domain frames is greater than one, according to the splicing strategy of first time domain and then spatial domain in time and spatial domains, in spatial domain, splice at adjacent positions according to a raster scan order, or splice at adjacent positions according to a zigzag scan order; and in the time domain, splice at same positions of different frames according to the raster scan order.

In other embodiments of the disclosure, the first processing unit 1502 is further configured to when determining that the amount of spliced time-domain frame is one, splice the sorted channel feature data in spatial domain according to the splicing strategy to obtain the target feature frame sequence.

In other embodiments of the disclosure, the first processing unit 1502 is further configured to splice the sorted channel feature data in spatial domain according to the strategy of first padding and then splicing.

In other embodiments of the disclosure, the first processing unit 1502 is further configured to pad each of sorted feature data in spatial domain. The first processing unit 1502 is further configured to splice the padded feature data in spatial domain, where there is a gap between the feature data of adjacent channels after padding.

In other embodiments of the disclosure, the encoding unit 1503 is configured to signal a height corresponding to padded feature data, and a width corresponding to the padded feature data into the bitstream, signal the channel amount corresponding to the feature data of the multiple channels, the height corresponding to feature data of a channel, and the width of the feature data of a channel into the bitstream, and signal the amount of spliced time-domain frame into the bitstream.

In other embodiments of the disclosure, the first obtaining unit 1501 is further configured to obtain the picture to-be-processed;

The first processing unit 1502 is further configured to extract features from the picture to-be-processed through the neural network model to obtain the feature data of the multiple channels.

Figure 19:
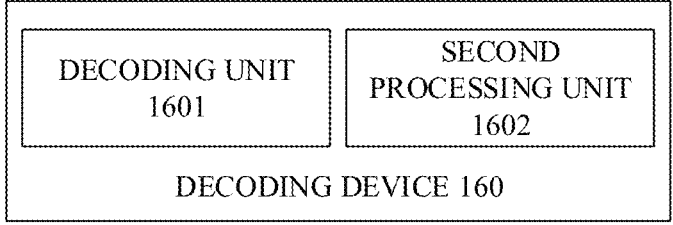
FIG. 19 is a schematic structural diagram of a decoder provided in embodiments of the disclosure.

FIG. 19 is a schematic structural diagram of a decoding device provided in embodiments of the disclosure. As illustrated in FIG. 19, the decoding device 160 includes a decoding unit 1601, and a second processing unit 1602.

The decoding unit 1601 is configured to parse a bitstream to obtain reconstructed feature frame sequence.

The second processing unit 1602 is configured to sort inversely the reconstructed feature frame sequence to obtain reconstructed feature data of multiple channels.

In other embodiments of the disclosure, the decoding unit 1601 is further configured to parse the bitstream to obtain a channel-order correspondence, a channel amount, an amount of spliced time-domain frame, a height corresponding to feature data of a channel, and a width of the feature data of the channel.

The second processing unit 1602 is further configured to determine the position of the feature data of each channel in the reconstructed feature frame sequence based on the channel amount, the amount of spliced time-domain frames, the height corresponding to the feature data of the channel, and the width of the feature data of the channel; determine an original channel-order of feature data at different positions in the reconstructed feature frame sequence based on the channel-order correspondence; and sort inversely the feature data at different positions in the reconstructed feature frame sequence based on the original channel-order to obtain the reconstructed feature data of the multiple channels.

In other embodiments of the disclosure, the decoding unit 1601 is further configured to parse the bitstream to obtain a height corresponding to padded feature data, and a width corresponding to the padded feature data.

The second processing unit 1602 is further configured to determine the position of feature data of each channel in the reconstructed feature frame sequence according to the channel amount, the amount of spliced time-domain frames, the height corresponding to the padded feature data, the width corresponding to the padded feature data, the height corresponding to the feature data of the channel, and the width corresponding to the feature data of the channel.

Figure 20:
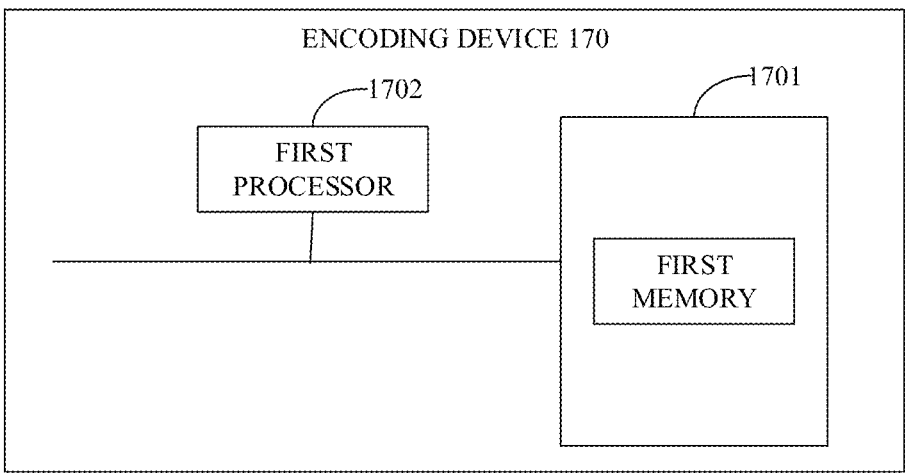
FIG. 20 is a schematic structural diagram of an encoder provided in embodiments of the disclosure.

FIG. 20 is a schematic structural diagram of an encoding device provided in embodiments of the disclosure. As illustrated in FIG. 20, the encoding device 170 (the encoding device 170 in FIG. 20 corresponds to the encoding device 150 in FIG. 18) includes a first memory 1701, and a first processor 1702.

The first processor 1702 is configured to implement the encoding method provided in embodiments of the disclosure when executing encoding instructions stored in the first memory 1701.

The first processor 1702 may be implemented in software, hardware, firmware, or a combination of software, hardware, and firmware, and may be circuitry, single or multiple application specific integrated circuits (ASIC), single or multiple general purpose integrated circuits, single or multiple microprocessors, single or multiple programmable logic devices, or combinations of the aforementioned circuits or devices, or other suitable circuits or devices, such that the processor may execute corresponding operations of the aforementioned encoding method.

Figure 21:
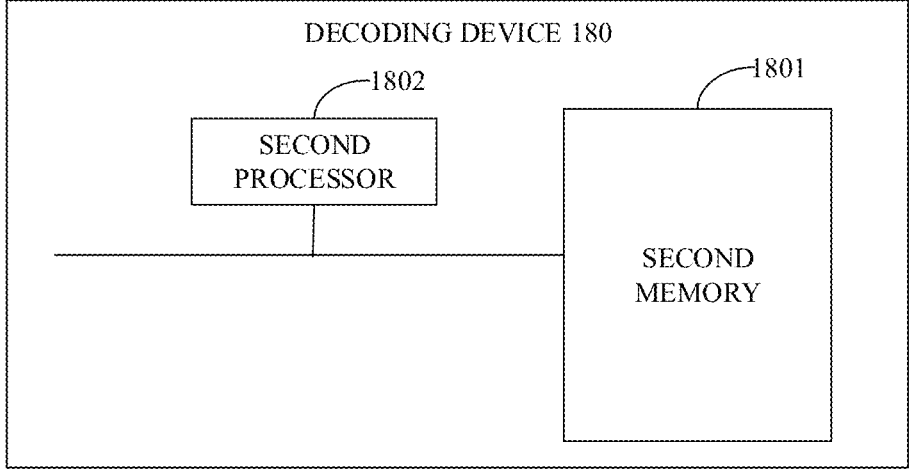
FIG. 21 is a schematic structural diagram of a decoder provided in embodiments of the disclosure.

FIG. 21 is a schematic structural diagram of a decoding device provided in embodiments of the disclosure. As illustrated in FIG. 21, the decoding device 180 (decoding device 180 in FIG. 21 corresponds to decoding device 160 in FIG. 19) includes a second memory 1801, and a second processor 1802.

The second processor 1802 is configured to implement the decoding method provided in embodiments of the disclosure when executing decoding instructions stored in the second memory 1801, where The second processor 1802 may be implemented in software, hardware, firmware, or a combination of software, hardware, and firmware, and may be circuitry, single or multiple application specific integrated circuits (ASIC), single or multiple general purpose integrated circuits, single or multiple microprocessors, single or multiple programmable logic devices, or combinations of the aforementioned circuits or devices, or other suitable circuits or devices, such that the processor may execute corresponding operations of the aforementioned encoding method.

The components in embodiments of the disclosure may be integrated in one processing unit, each unit may physically exist separately, or two or more units may be integrated in one unit. The integrated unit may be implemented either in the form of hardware or in the form of software function modules.

If the integrated unit is implemented in the form of a software function module and is not sold or used as an independent product, the integrated unit may be stored in a computer-readable storage medium. Based on this understanding, the technical solution of embodiments of the disclosure can be embodied in the form of a software product in essence or in part or in whole or in part that contributes to the prior art. The computer software product is stored in a storage medium that includes instructions to cause a computer device (which may be a personal computer, cloud server, or network device, etc.) or processor to perform all or part of the operations of embodiments of the disclosed method. The aforementioned storage medium includes: ferromagnetic random access memory (FRAM), read only memory (ROM), programmable read-only memory (PROM), erasable programmable read-only memory (EPROM), electrically erasable programmable read-only memory (EEPROM), flash memory, magnetic surface memory, compact disc memory, or compact disc read-only memory (CD-ROM) and other media that may store program codes, which are not limited in embodiments of the disclosure.

Embodiments of the disclosure also provide a computer-readable storage medium storing executable encoding instructions which, when executed by a first processor, cause the first processor to implement the encoding method provided by embodiments of the disclosure.

Embodiments of the disclosure also provide a computer-readable storage medium storing executable decoding instructions which, when executed by a second processor, cause the second processor to implement the decoding method provided by embodiments of the disclosure.

INDUSTRIAL PRACTICALITY

Embodiments of the disclosure provide a method for encoding feature data, a method for decoding feature data, an encoder, a decoder and a storage medium. In the method for encoding feature data, feature data of multiple channels corresponding to a picture to-be-processed is obtained. Feature data of a reference channel in the feature data of the multiple channels is determined. Sorted feature data of the multiple channels is obtained by sorting, starting from the feature data of the reference channel, the feature data of the multiple channels in a descending order of similarity among the feature data of the multiple channels. The sorted feature data of the multiple channels is spliced to obtain a target feature frame sequence. The target feature frame sequence is encoded to generate a bitstream. That is, in the disclosure, after the feature data of the multiple channels are obtained, feature data of one channel is used as a reference, i.e., the feature data of the reference channel is obtained. The feature data of all channels is sorted according to the descending order of similarity between the feature data of each channel and the feature data of the reference channel. As such, the correlation among adjacent channels in time and spatial domains is large after sorting, so that feature data of the channel in an adjacent region with high similarity can be used as reference for subsequent coding, thereby improving the coding efficiency of feature data.

What is claimed is:

1. A method for encoding feature data, comprising:
   obtaining first feature data of a plurality of channels corresponding to a picture to-be-processed;
   determining second feature data of a reference channel in the first feature data of the plurality of channels;
   obtaining sorted feature data of the plurality of channels by sorting, starting from the second feature data of the reference channel, the first feature data of the plurality of channels in a descending order of similarity among the first feature data of the plurality of channels;
   splicing the sorted feature data of the plurality of channels to obtain a target feature frame sequence; and
   encoding the target feature frame sequence to generate a bitstream;
   wherein determining the second feature data of the reference channel in the first feature data of the plurality of channels comprises:
   determining, among the first feature data of the plurality of channels, feature data of a channel as the second feature data of the reference channel when a cumulative sum of values of the feature data of the channel satisfies a target condition.

2. The method of claim 1, wherein the target condition comprises:

the cumulative sum of the values of the feature data being greatest among the first feature data of the plurality of channels; or the cumulative sum of the values of the feature data being smallest among the first feature data of the plurality of channels.

3. The method of claim 1, wherein after obtaining the sorted feature data of the plurality of channels by sorting, starting from the second feature data of the reference channel, the first feature data of the plurality of channels in the descending order of similarity among the first feature data of the plurality of channels, the method further comprises:

obtaining a channel-order correspondence between an original channel-order of the first feature data of the plurality of channels in the picture to-be-processed and an encoding channel-order of the sorted feature data of the plurality of channels; and signalling the channel-order correspondence into the bit-stream.

4. The method of claim 3, wherein the channel-order correspondence comprises:

when an amount of spliced time-domain frame is one, the original channel-order is an X-th channel, and the encoding channel-order corresponding to the original channel-order is an I-th channel; and when an amount of the spliced time-domain frames is at least two, the original channel-order is the X-th channel, and the encoding channel-order corresponding to the original channel-order is an N_I-th channel.

5. The method of claim 1, wherein splicing the sorted feature data to obtain the target feature frame sequence comprises:

determining that an amount of spliced time-domain frames is greater than one, and splicing the sorted feature data of the plurality of channels according to a splicing strategy in time and spatial domains to obtain the target feature frame sequence.

6. The method of claim 5, wherein determining that the amount of spliced time-domain frames is greater than one, and splicing the sorted feature data of the plurality of channels according to the splicing strategy in time and spatial domains to obtain the target feature frame sequence comprises:

determining that the amount of spliced time-domain frames is greater than one, and splicing the sorted feature data of the plurality of channels according to the splicing strategy in time and spatial domains to obtain spliced feature data;

determining a product of a row amount of the spliced feature data, a column amount of the spliced feature data, and the amount of the spliced time-domain frames; and determining that a channel amount of the first feature data of the plurality of channels is less than the product, and padding a region without a channel of feature data in a spliced frame to obtain the target feature frame sequence.

7. The method of claim 5, wherein determining that the amount of spliced time-domain frames is greater than one, and splicing the sorted feature data of the plurality of channels according to the splicing strategy in time and spatial domains comprises:

determining that the amount of spliced time-domain frames is greater than one; and

24 according to a splicing strategy of first time domain and then spatial domain in time and spatial domains:

in time domain, splicing at same positions in different frames according to a raster scan order; and in spatial domain, splicing at adjacent positions according to the raster scan order or splicing at adjacent positions according to a zigzag scan order.

8. The method of claim 5, wherein determining that the amount of spliced time-domain frames is greater than one, and splicing the sorted feature data of the plurality of channels according to the splicing strategy in time and spatial domains comprises:

determining that the amount of spliced time-domain frames is greater than one, and according to a splicing strategy of first spatial domain and then time domain in time and spatial domains:

in spatial domain, splicing at adjacent positions according to a raster scan order, or splicing at adjacent positions according to a zigzag scan order; and in time domain, splicing at same positions in different frames according to the raster scan order.

9. The method of claim 1, wherein splicing the sorted feature data to obtain the target feature frame sequence comprises:

determining that an amount of spliced time-domain frame is one, and splicing the sorted feature data according to a splicing strategy in spatial domain to obtain the target feature frame sequence.

10. The method of claim 1, wherein splicing the sorted feature data comprises:

splicing the sorted feature data according to a strategy of first padding and then splicing in spatial domain.

11. The method of claim 10, wherein splicing the sorted feature data according to the strategy of first padding and then splicing in spatial domain comprises:

padding each of the sorted feature data in spatial domain, and splicing padded feature data in spatial domain;

wherein there is a gap between feature data of adjacent channels after padding.

12. The method of claim 11, wherein after splicing padded feature data in spatial domain, the method further comprises:

signalling a height and a width corresponding to the padded feature data into the bitstream.

13. The method of claim 1, further comprising:

signalling a channel amount corresponding to the first feature data of the plurality of channels, a height corresponding to feature data of a channel, and a width corresponding to the feature data of the channel into the bitstream.

14. The method of claim 4, further comprising:

signalling an amount of spliced time-domain frame into the bitstream.

15. The method of claim 1, further comprising:

obtaining the picture to-be-processed; and performing feature extraction on the picture to-be-processed with a neural network model to obtain the first feature data of the plurality of channels.

16. A method for decoding feature data, comprising:

parsing a bitstream to obtain a reconstructed feature frame sequence and sorted feature data of a plurality of channels, wherein the sorted feature data of the plurality of channels is in an order obtained by sorting, starting from second feature data of a reference channel, first feature data of the plurality of channels in a descending order of similarity among the first feature data of the plurality of channels; and sorting inversely the sorted feature data of the plurality of channels to obtain reconstructed feature data of the plurality of channels;

wherein the second feature data of the reference channel is determined from the first feature data of the plurality of channels when a cumulative sum of values of the second feature data of the reference channel satisfies a target condition.

17. The method of claim 16, further comprising:

parsing the bitstream to obtain a channel-order correspondence, a channel amount, an amount of spliced time-domain frames, a height corresponding to feature data of a channel, and a width corresponding to the feature data of the channel; and determining a position of feature data of each channel in the reconstructed feature frame sequence according to the channel amount, an amount of spliced time-domain frames, the height corresponding to the feature data of the channel, and the width corresponding to the feature data of the channel;

wherein correspondingly, sorting inversely the sorted feature data of the plurality of channels to obtain the reconstructed feature data of the plurality of channels comprises:

determining an original channel-order of feature data at different positions in the reconstructed feature frame sequence based on the channel-order correspondence; and sorting inversely the feature data at different positions in the reconstructed feature frame sequence based on the original channel-order to obtain the reconstructed feature data of the plurality of channels.

18. The method of claim 17, further comprising:

parsing the bitstream to obtain a height corresponding to padded feature data and a width corresponding to the padded feature data; wherein wherein correspondingly, determining the position of feature data of each channel in the reconstructed feature frame sequence according to the channel amount, the amount of spliced time-domain frames, the height corresponding to the feature data of the channel and the width corresponding to the feature data of the channel comprises:

determining the position of feature data of each channel in the reconstructed feature frame sequence according to the channel amount, the amount of spliced time-domain frames, the height corresponding to the padded feature data, the width corresponding to the padded feature data, the height corresponding to the feature data of the channel and the width corresponding to the feature data of the channel.

19. A decoder, comprising:

a processor and a memory storing a computer program which, when executed by the processor, causes the processor to:

parse a bitstream to obtain a reconstructed feature frame sequence and sorted feature data of a plurality of channels, wherein the sorted feature data of the plurality of channels is in an order obtained by sorting, starting from second feature data of a reference channel, first feature data of the plurality of channels in a descending order of similarity among the first feature data of the plurality of channels; and sort inversely the sorted feature data of the plurality of channels to obtain reconstructed feature data of the plurality of channels;

wherein the second feature data of the reference channel is determined from the first feature data of the plurality of channels when a cumulative sum of values of the second feature data of the reference channel satisfies a target condition.

* * * * *